(12) United States Patent
Sutou et al.

(10) Patent No.: US 11,203,177 B2
(45) Date of Patent: Dec. 21, 2021

(54) DECORATIVE SHEET

(71) Applicant: Dai Nippon Printing Co., Ltd., Tokyo (JP)

(72) Inventors: Masatoshi Sutou, Tokyo (JP); Yoshiyuki Meiki, Tokyo (JP); Sakie Kataoka, Tokyo (JP); Yoko Takano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/559,547

(22) PCT Filed: Mar. 30, 2016

(86) PCT No.: PCT/JP2016/060457
§ 371 (c)(1),
(2) Date: Sep. 19, 2017

(87) PCT Pub. No.: WO2016/159119
PCT Pub. Date: Oct. 6, 2016

(65) Prior Publication Data
US 2018/0043653 A1    Feb. 15, 2018

(30) Foreign Application Priority Data

Mar. 30, 2015 (JP) .............................. JP2015-070352
Mar. 30, 2015 (JP) .............................. JP2015-070353
(Continued)

(51) Int. Cl.
*B32B 3/26* (2006.01)
*B29C 48/21* (2019.01)
(Continued)

(52) U.S. Cl.
CPC .......... *B32B 3/263* (2013.01); *B29C 45/1671* (2013.01); *B29C 48/21* (2019.02);
(Continued)

(58) Field of Classification Search
None
See application file for complete search history.

(56) References Cited

U.S. PATENT DOCUMENTS 3,022,207 A    2/1962  Lang
3,635,754 A *  1/1972  Beede ................... C09J 123/16
                                                      428/349
(Continued)

FOREIGN PATENT DOCUMENTS

CN    103253055 A *  8/2013
EP    0 320 925 B  *  6/1989
(Continued)

OTHER PUBLICATIONS

EP 2 848 403 A (Gornik et al) (published Mar. 8, 2015) (English translation) (Year: 2015).*
(Continued)

*Primary Examiner* — Vivian Chen
(74) *Attorney, Agent, or Firm* — Locke Lord LLP

(57) ABSTRACT

Provided is a decorative sheet which can impart, to molded resin articles, excellent design attractiveness and an excellent touch both due to a rugged shape. The decorative sheet comprises, superposed in the following order, a base layer, a surface layer which is constituted of a cured object obtained from a curable resin composition and has the rugged shape, and a removable thermoplastic resin film.

15 Claims, 5 Drawing Sheets

(30) Foreign Application Priority Data

| | | |
|---|---|---|
| May 29, 2015 | (JP) | JP2015-110738 |
| Jun. 12, 2015 | (JP) | JP2015-119725 |
| Sep. 29, 2015 | (JP) | JP2015-192320 |

(51) Int. Cl.

| | |
|---|---|
| *B32B 27/00* | (2006.01) |
| *B44C 1/17* | (2006.01) |
| *B44C 5/04* | (2006.01) |
| *B29C 45/16* | (2006.01) |
| *B32B 7/12* | (2006.01) |
| *B32B 27/36* | (2006.01) |
| *B32B 37/06* | (2006.01) |
| *B32B 37/12* | (2006.01) |
| *B32B 38/06* | (2006.01) |
| *B44C 3/02* | (2006.01) |
| *B44C 1/24* | (2006.01) |
| *B32B 38/10* | (2006.01) |
| *B32B 27/30* | (2006.01) |
| *B32B 37/16* | (2006.01) |
| *B32B 27/16* | (2006.01) |
| *B32B 37/15* | (2006.01) |
| *B29C 48/15* | (2019.01) |
| *B29K 67/00* | (2006.01) |
| *B29K 101/12* | (2006.01) |
| *B29L 7/00* | (2006.01) |
| *B29L 9/00* | (2006.01) |

(52) U.S. Cl.
CPC ............... *B32B 7/12* (2013.01); *B32B 27/00* (2013.01); *B32B 27/36* (2013.01); *B32B 37/06* (2013.01); *B32B 37/12* (2013.01); *B32B 38/06* (2013.01); *B44C 1/1712* (2013.01); *B44C 5/0453* (2013.01); *B29C 45/16* (2013.01); *B29C 45/1679* (2013.01); *B29C 48/15* (2019.02); *B29K 2067/00* (2013.01); *B29K 2101/12* (2013.01); *B29L 2007/00* (2013.01); *B29L 2009/00* (2013.01); *B32B 27/16* (2013.01); *B32B 27/30* (2013.01); *B32B 37/15* (2013.01); *B32B 37/16* (2013.01); *B32B 38/10* (2013.01); *B44C 1/24* (2013.01); *B44C 3/025* (2013.01); *Y10T 428/31786* (2015.04); *Y10T 428/31855* (2015.04); *Y10T 428/31931* (2015.04); *Y10T 428/31935* (2015.04); *Y10T 428/31938* (2015.04)

(56) References Cited

U.S. PATENT DOCUMENTS

| | | | | |
|---|---|---|---|---|
| 3,654,044 A * | 4/1972 | Hirota | ....................... | B27M 1/00 428/151 |
| 3,941,636 A * | 3/1976 | Drout | ....................... | B44C 1/205 156/154 |
| 4,552,792 A * | 11/1985 | Julian | ....................... | B32B 21/06 428/42.2 |
| 4,759,982 A * | 7/1988 | Jenssen | ................. | B44C 1/1733 29/527.4 |
| 5,019,202 A * | 5/1991 | Kawahata | ................. | B44C 3/00 101/488 |
| 5,215,826 A * | 6/1993 | Shimanski | .......... | B29C 33/0016 428/483 |
| 5,254,612 A * | 10/1993 | Sugi | ........................... | C08J 5/18 524/274 |
| 5,750,234 A * | 5/1998 | Johnson | ..................... | B32B 5/18 428/141 |
| 5,885,490 A * | 3/1999 | Kawaguchi | ............. | B29C 59/04 264/1.32 |
| 5,919,537 A * | 7/1999 | Niazy | ....................... | B32B 7/06 428/40.1 |
| 5,968,657 A * | 10/1999 | Scullin | ................. | B29C 37/0025 428/423.1 |
| 5,985,078 A * | 11/1999 | Suess | ....................... | B41M 5/24 156/235 |
| 6,103,328 A * | 8/2000 | Niazy | ....................... | B32B 7/06 428/40.1 |
| 6,326,074 B1 * | 12/2001 | Takahashi | ................ | B05D 5/06 428/156 |
| 6,395,390 B1 * | 5/2002 | Inoue | ....................... | B32B 7/12 428/343 |
| 6,440,546 B1 * | 8/2002 | Fields | ................. | B29C 37/0025 428/220 |
| 7,527,852 B2 * | 5/2009 | Sigel | ....................... | B05D 5/061 428/195.1 |
| 7,892,598 B1 * | 2/2011 | Dronzek | .................. | G09F 3/20 156/247 |
| 8,945,708 B1 * | 2/2015 | Vogel | ................. | B32B 17/10743 428/339 |
| 9,434,096 B2 * | 9/2016 | Yamashita | .......... | B29C 37/0032 |
| 10,792,887 B2 * | 10/2020 | Kataoka | .................... | B44C 3/02 |
| 2001/0020515 A1 * | 9/2001 | Shibata | .................... | C09J 7/387 156/329 |
| 2002/0009587 A1 * | 1/2002 | Inoue | ....................... | C09J 7/383 428/355 RA |
| 2002/0187314 A1 * | 12/2002 | Shibata | ................... | B32B 21/06 428/195.1 |
| 2003/0075264 A1 * | 4/2003 | Terakado | ............ | B29C 48/9155 156/244.24 |
| 2003/0108718 A1 * | 6/2003 | Simon | ..................... | B29C 44/06 428/172 |
| 2003/0170460 A1 * | 9/2003 | Sienkiewicz | ..... | B29C 45/14811 428/411.1 |
| 2005/0089671 A1 * | 4/2005 | Kubota | ................. | B29C 33/424 428/143 |
| 2006/0240247 A1 * | 10/2006 | Haller | ..................... | B05D 7/544 428/335 |
| 2007/0026205 A1 * | 2/2007 | Anton | ....................... | B05D 5/06 428/195.1 |
| 2007/0116903 A1 * | 5/2007 | Song | ....................... | B05D 1/286 428/31 |
| 2007/0231583 A1 * | 10/2007 | Iizuka | ..................... | B32B 27/42 428/423.7 |
| 2008/0220250 A1 * | 9/2008 | Ortmeier | ................. | B32B 27/20 428/339 |
| 2009/0001752 A1 * | 1/2009 | Buhring | ............. | B29C 35/0266 296/70 |
| 2010/0021737 A1 * | 1/2010 | Beck | ....................... | B29C 48/22 428/411.1 |
| 2010/0028554 A1 * | 2/2010 | Ogawa | ..................... | B29C 59/04 427/487 |
| 2010/0196668 A1 * | 8/2010 | Atake | ..................... | B29C 45/1418 428/172 |
| 2011/0052880 A1 * | 3/2011 | Iizuka | ..................... | B30B 15/06 428/172 |
| 2011/0143096 A1 * | 6/2011 | Huang | ..................... | B32B 27/08 428/161 |
| 2011/0151208 A1 * | 6/2011 | Huang | ..................... | B44C 1/172 428/201 |
| 2011/0200818 A1 * | 8/2011 | Djunaidi | ............ | C08G 18/8175 428/343 |
| 2012/0141732 A1 * | 6/2012 | Patel | ....................... | C09J 7/203 428/141 |
| 2012/0141735 A1 * | 6/2012 | Chevallier | ................ | B44C 1/10 428/141 |
| 2012/0141739 A1 * | 6/2012 | Chevallier | .............. | B44C 1/105 428/156 |
| 2012/0156445 A1 * | 6/2012 | Schmidt | ................. | B29C 43/222 428/195.1 |
| 2013/0014891 A1 * | 1/2013 | Vandevoorde | ............. | B44C 5/04 156/277 |
| 2014/0057117 A1 * | 2/2014 | Suzuki | ................. | C08G 18/6295 428/423.1 |
| 2014/0106148 A1 * | 4/2014 | Kanzler | ..................... | C08F 2/48 428/213 |

(56) References Cited

U.S. PATENT DOCUMENTS

| | | | | |
|---|---|---|---|---|
| 2014/0120329 A1* | 5/2014 | Hu | ............................ | B32B 7/02 |
| | | | | 428/201 |
| 2014/0364520 A1* | 12/2014 | Oh | ....................... | C09D 127/06 |
| | | | | 521/56 |
| 2014/0374951 A1 | 12/2014 | Piccin | | |
| 2015/0132521 A1* | 5/2015 | Amick | ...................... | B32B 7/12 |
| | | | | 428/41.3 |
| 2016/0238929 A1* | 8/2016 | Schmidt | ................... | G03F 7/035 |
| 2017/0217123 A1* | 8/2017 | Kataoka | ................... | B32B 27/00 |
| 2018/0022910 A1* | 1/2018 | Kawagoe | .............. | C08F 265/06 |
| | | | | 428/522 |

FOREIGN PATENT DOCUMENTS

| | | | | |
|---|---|---|---|---|
| EP | 1 669 191 | A1 | | 6/2006 |
| EP | 2 848 403 | B | * | 3/2015 |
| JP | 02-095817 | A | | 4/1990 |
| JP | 08-267696 | A | * | 10/1996 |
| JP | 10-035193 | A | * | 2/1998 |
| JP | 10-264348 | A | * | 10/1998 |
| JP | H10-264348 | A | | 10/1998 |
| JP | 11-227132 | A | * | 8/1999 |
| JP | 11-277708 | A | | 10/1999 |
| JP | 2000-053889 | A | * | 2/2000 |
| JP | 2002-267816 | A | | 9/2002 |
| JP | 2003-103996 | A | | 4/2003 |
| JP | 2004-042409 | A | | 2/2004 |
| JP | 2005-211707 | A | * | 8/2005 |
| JP | 2006-142698 | A | | 6/2006 |
| JP | 2008-087267 | A | | 4/2008 |
| JP | 2008-137216 | A | | 6/2008 |
| JP | 2008-189943 | A | * | 8/2008 |
| JP | 2011-173285 | A | * | 9/2011 |
| JP | 2013-043417 | A | | 3/2013 |
| WO | WO 94/03337 | A | * | 2/1994 |
| WO | 2010-088769 | A1 | | 8/2010 |

OTHER PUBLICATIONS

EP 0 320 925 A (Bernd et al.) (published Jun. 21, 1989) (English translation) (Year: 1989).*

International Search Report dated Jul. 5, 2016 issued for PCT/JP2016/060457.

Search Report dated Oct. 15, 2018, issued for Counterpart European Patent Application No. 16773000.1.

Office Action dated Sep. 16, 2019, issued for Counterpart Chinese Patent Appln. No. 201680018573.4.

* cited by examiner

DECORATIVE SHEET

TECHNICAL FIELD

The present invention relates to a decorative sheet capable of imparting an excellent design feeling and touch feeling from an irregular shape.

BACKGROUND ART

Decorative resin molded articles with a decorative sheet laminated on the surface of a resin molded article are used in vehicle interior components, building interior materials, cases for home electric appliances, and the like. In recent years, with diversification of the consumers' needs, decorative resin molded articles having various design properties have been required. Development of a decorative resin molded article which has an irregular shape on a surface thereof and which is excellent in not only design feeling but also touch feeling is desired for keeping up with the diversification of the consumers' needs.

Heretofore, for production of a decorative resin molded article, a molding method has been used in which a decorative sheet given a design property beforehand is integrated with a resin by injection molding, and for production of a decorative resin molded article provided with an irregular shape, a decorative sheet having an irregular shape on a surface thereof has been used.

However, production of a decorative resin molded article using a decorative sheet having an irregular shape has the disadvantage that since the irregular shape is deformed or eliminated under heat or pressure at the time of subjecting the decorative sheet to injection molding or preceding premolding (vacuum molding), the decorative sheet after injection molding cannot maintain an initial irregular shape, and thus a design feeling and a touch feeling from the irregular shape cannot be sufficiently imparted.

For overcoming such a disadvantage, a method has been suggested in which by extrusion molding or hot melt coating, a cushion layer composed of a thermoplastic resin is laminated to a surface of a decorative sheet with irregularities formed on a thermoplastic substrate sheet by embossing, whereby occurrence of deformation and elimination of an irregular shape during vacuum molding and injection molding is suppressed, and after injection molding, the cushion layer is removed (see, for example, Patent Document 1).

However, the method disclosed in Patent Document 1 has the problem that since the cushion layer provided for suppressing deformation and elimination of an irregular shape is formed by extrusion molding or hot melt coating of a thermoplastic resin, a fine irregular shape on a surface of the thermoplastic substrate sheet is easily deformed or eliminated by heat of a molten thermoplastic resin.

PRIOR ART DOCUMENT

Patent Document

Patent Document 1: Japanese Patent Laid-open Publication No. 2008-137216

SUMMARY OF THE INVENTION

Problems to be Solved by the Invention

A main object of the present invention is to provide a decorative sheet capable of imparting an excellent design feeling and touch feeling from an irregular shape to a resin molded article. Further, an object of the present invention is to provide a decorative resin molded article obtained using the decorative sheet, a method for producing the decorative sheet, and a method for producing the decorative resin molded article.

Means for Solving the Problem

In order to achieve the above-mentioned object, the present inventors have extensively conducted studies. Resultantly, the present inventors have found that in a decorative sheet in which at least a base material layer, a surface layer formed of a cured product of a curable resin composition and having an irregular shape, and a releasable thermoplastic resin film layer are laminated in this order, the irregular shape of the surface layer formed of the cured product of the curable resin composition can be effectively protected by the releasable thermoplastic resin film layer. Then, the present inventors have found that by using the decorative sheet, occurrence of deformation and elimination of an irregular shape during vacuum molding and injection molding is suppressed, so that an excellent design feeling and touch feeling from the irregular shape can be imparted to a decorative resin molded article. The first invention of the present invention is completed by further conducting studies based on the above-mentioned findings.

That is, the first invention provides inventions of aspects as listed below.

Item 1. A decorative sheet in which at least a base material layer, a surface layer formed of a cured product of a curable resin composition and having an irregular shape, and a releasable thermoplastic resin film layer are laminated in this order.

Item 2. The decorative sheet according to item 1, wherein the surface layer is formed of a cured product of an ionizing radiation curable resin composition.

Item 3. The decorative sheet according to item 1 or 2, wherein the thermoplastic resin film layer contains a non-crystalline polyester resin.

Item 4. The decorative sheet according to any one of items 1 to 3, wherein the thermoplastic resin film layer is laminated on the irregular shape of the surface layer by extrusion molding or heat lamination.

Item 5. The decorative sheet according to any one of items 1 to 4, wherein the thermoplastic resin film layer fills recesses in the irregular shape of the surface layer.

Item 6. The decorative sheet according to any one of items 1 to 5, wherein an adhesive layer is laminated between the surface layer and the thermoplastic resin film layer.

Item 7. The decorative sheet according to any one of items 1 to 6, wherein a primer layer is laminated immediately below the surface layer.

Item 8. The decorative sheet according to any one of items 1 to 7, wherein a pattern layer is laminated between the base material layer and the surface layer.

Item 9. The decorative sheet according to any one of items 1 to 8, wherein the irregular shape of the surface layer is formed by partially provided projections, and recesses in which a layer below the surface layer is exposed between the projections.

Item 10. The decorative sheet according to any one of items 1 to 9, wherein the thickness of the surface layer is 0.01 to 30 μm.

Item 11. A method for producing a decorative sheet, the method including:

a first step of forming a laminated body in which a surface layer having an irregular shape and formed of a cured product of a curable resin composition is laminated on a base material layer; and a second step of laminating a releasable thermoplastic resin film layer on the surface layer of the laminated body obtained in the first step.

Item 12. The method for producing a decorative sheet according to item 11, wherein the thermoplastic resin film layer contains a noncrystalline polyester resin.

Item 13. The method for producing a decorative sheet according to item 11 or 12, wherein the second step includes the step of:

laminating the releasable thermoplastic resin film layer on the surface layer by extrusion molding or heat lamination so as to fill recesses in the irregular shape of the surface layer.

Item 14. The method for producing a decorative sheet according to item 11 or 12, wherein the second step includes the steps of:

laminating an adhesive layer on the surface layer so as to fill recesses in the irregular shape of the surface layer by applying a resin composition; and forming the releasable thermoplastic resin film layer on the adhesive layer.

Item 15. A decorative resin molded article with a thermoplastic resin film layer in which at least a molded resin layer, a base material layer, a surface layer formed of a cured product of a curable resin composition and having an irregular shape, and a releasable thermoplastic resin film layer are laminated in this order.

Item 16. A method for producing a decorative resin molded article with a thermoplastic resin film layer, the method including the step of laminating a molded resin layer on the base material layer of the decorative sheet according to any one of items 1 to 10 by injecting a resin.

Item 17. A method for producing a decorative resin molded article, the method including the step of separating the thermoplastic resin film layer from the decorative resin molded article with a thermoplastic resin film layer according to item 15.

In order to achieve the above-mentioned object, the present inventors have further extensively conducted studies. Resultantly, the present inventors have found that in a decorative sheet in which at least a surface layer having an irregular shape, and a releasable irregularity protective layer are laminated, the irregularity protective layer including an adhesive layer filling recesses in the irregular shape of the surface layer, and a release film layer in this order from the surface layer side, the irregular shape of the surface layer can be effectively protected by the irregularity protective layer. Then, the present inventors have found that by using the decorative sheet, occurrence of deformation and elimination of an irregular shape during vacuum molding and injection molding is suppressed, so that an excellent design feeling and touch feeling from the irregular shape can be imparted to a decorative resin molded article. The second invention of the present invention is completed by further conducting studies based on the above-mentioned findings.

That is, the second invention provides inventions of aspects as listed below.

Item 18. A decorative sheet in which at least a surface layer having an irregular shape, and a releasable irregularity protective layer are laminated, the irregularity protective layer including an adhesive layer filling recesses in the irregular shape of the surface layer, and a release film layer in this order from the surface layer side.

Item 19. The decorative sheet according to item 18, wherein the adhesive layer is formed of a cured product of a curable resin.

Item 20. The decorative sheet according to item 18 or 19, wherein the irregularity protective layer includes a release layer, the adhesive layer and the release film layer in this order from the surface layer side, and the release layer and the adhesive layer fill recesses in the irregular shape of the surface layer.

Item 21. The decorative sheet according to any one of items 18 to 20, wherein the release layer is formed of a cured product of an ionizing radiation curable resin composition.

Item 22. The decorative sheet according to any one of items 18 to 21, wherein the surface layer is formed of a cured product of a curable resin composition or a resin film.

Item 23. The decorative sheet according to any one of items 18 to 22, wherein a primer layer is laminated immediately below the surface layer.

Item 24. The decorative sheet according to any one of items 18 to 23, wherein a pattern layer is laminated on the surface layer on a side opposite to the irregularity protective layer.

Item 25. A method for producing a decorative sheet, the method including:

a first step of providing a surface layer having an irregular shape;

a second step of laminating an adhesive layer on the surface layer by applying an adhesive so as to fill recesses in the irregular shape of the surface layer; and a third step of laminating a release film layer on the adhesive layer.

Item 26. The method for producing a decorative sheet according to item 25, wherein the first step includes the steps of:

laminating a pattern layer and a primer layer in this order on a base material layer;

performing embossing from above the primer layer to form an irregular shape on a surface of the primer layer; and applying a curable resin composition onto the primer layer, and then curing the curable resin composition to laminate a surface layer having an irregular shape.

Item 27. The method for producing a decorative sheet according to item 25, wherein the first step includes the steps of:

providing a surface layer composed of a resin film; and performing embossing from above the surface layer to form an irregular shape on a surface of the surface layer.

Item 28. The method for producing a decorative sheet according to item 25, wherein the first step includes the steps of:

laminating a pattern layer and a primer layer in this order on the base material layer;

laminating a surface layer on the primer layer by laminating a resin film; and performing embossing from above the surface layer to form an irregular shape on a surface of the surface layer.

Item 29. A decorative resin molded article with an irregularity protective layer in which at least a molded resin layer, a surface layer having an irregular shape, and a releasable irregularity protective layer are laminated in this order, the irregularity protective layer including an adhesive layer filling recesses in the irregular shape of the surface layer, and a release film layer in this order from the surface layer side.

Item 30. A method for producing a decorative resin molded article, the method including the step of separating the irregularity protective layer from the decorative resin molded article with an irregularity protective layer according to item 29.

Item 31. A method for producing a decorative resin molded article with an irregularity protective layer, the method including the step of forming a molded resin layer on the surface layer side of the decorative sheet according to any one of items 18 to 24 by injecting a resin.

Advantages of the Invention

According to the present invention, there can be provided a decorative sheet capable of imparting an excellent design feeling and touch feeling from an irregular shape to a resin molded article. According to the present invention, there can be provided a decorative resin molded article obtained using the decorative sheet, a method for producing the decorative sheet, and a method for producing the decorative resin molded article.

EMBODIMENTS OF THE INVENTION

1. Decorative Sheet

Figure 1:
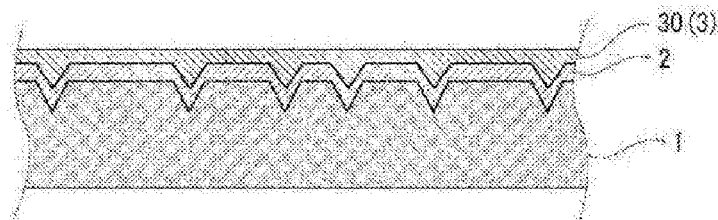
FIG. 1 is a schematic view of a cross section structure of one form of a decorative sheet of the first invention.

The first invention provides a decorative sheet in which at least a base material layer, a surface layer formed of a cured product of a curable resin composition and having an irregular shape, and a releasable thermoplastic resin film layer are laminated in this order.

The second invention provides a decorative sheet in which at least a surface layer having an irregular shape, and a releasable irregularity protective layer are laminated, the irregularity protective layer including an adhesive layer filling recesses in the irregular shape of the surface layer, and a release film layer in this order from the surface layer side.

In this specification, the "(meth)acrylic acid" means an "acrylic acid or methacrylic acid" unless otherwise specified, and the same applies to other similar terms. The decorative sheet of the present invention may have no pattern layer etc., and may be, for example, transparent.

Hereinafter, the decorative sheet of the present invention will be described in detail. Hereinafter, matters that are not common in the first invention and the second invention are clearly described, and unless otherwise specified, descriptions of common matters are omitted in the second invention. For example, the configurations of a base material layer 1, an ionizing radiation curable resin, a release layer 32, a primer layer 4, a pattern layer 5, a masking layer, a transparent resin layer 6 and a back adhesive layer are common in the first invention and the second invention. A method for producing a decorative resin molded article with an irregularity protective layer is common in the first invention and the second invention except that in the second invention, the decorative sheet of the second invention is used in place of the decorative sheet of the first invention.

Laminated Structure of Decorative Sheet

The decorative sheet of the first invention has a laminated structure in which at least a base material layer 1, a surface layer 2 formed of a cured product of a curable resin composition and having an irregular shape, and a releasable thermoplastic resin film layer 30 are laminated in this order. The surface layer 2 may include a plurality of layers.

In the first invention, the surface layer 2 and the thermoplastic resin film layer 30 may be laminated directly with each other, or other layer may be laminated between these layers. When the thermoplastic resin film layer 30 is laminated directly, the thermoplastic resin film layer 30 serves as an irregularity protective layer 3 that protects the irregular shape of the surface layer 2. When other layer is laminated between the surface layer 2 and the thermoplastic resin film layer 30, the other layer and the thermoplastic resin film layer 30 can serve as the irregularity protective layer 3. Examples of the other layer include an adhesive layer 31 and a release layer 32.

When other layer is laminated in the first invention, a laminated body in which the adhesive layer 31 and the thermoplastic resin film layer 30 are laminated in this order from the surface layer 2 side; a laminated body in which the release layer 32 and the thermoplastic resin film layer 30 are laminated in this order from the surface layer 2 side; and laminated body in which the release layer 32, the adhesive layer 31 and the thermoplastic resin film layer 30 are laminated in this order from the surface layer 2 side can each serve as the irregularity protective layer 3.

In the first invention, the release layer 32 fills recesses in the irregular shape of the surface layer 2. When the adhesive layer 31 is formed of an adhesive, the adhesive layer 31 fills recesses in the irregular shape of the surface layer 2. When the release layer 32 and the adhesive layer 31 formed of an adhesive are laminated, the release layer 32 and the adhesive layer 31 fill recesses in the irregular shape of the surface layer 2 in the decorative sheet of the first invention. The adhesive layer 31 may be a pressure sensitive adhesive layer, and is formed of an adhesive or a pressure sensitive adhesive as described later.

In the decorative sheet of the first invention, a primer layer 4 may be provided between the base material layer 1 and the surface layer 2 as necessary for the purpose of improving bondability between the layers. When the surface layer 2 is formed by a plurality of layers, for example, a plurality of surface layers 2 may be laminated with the primer layer 4 interposed between surface layers 2.

In the first invention, a pattern layer 5 may be provided between the base material layer 1 and the surface layer 2 or on the base material layer 1 on a side opposite to the surface layer 2 as necessary for the purpose of imparting decorativeness. When the primer layer 4 is provided, the pattern layer 5 may be provided between the base material layer 1 and the primer layer 4. A plurality of pattern layers 5 may be provided.

In the first invention, a masking layer (not illustrated) may be provided between the base material layer 1 and the surface layer 2 as necessary for the purpose of suppressing a change and variation in color of the base material layer 1. When the primer layer 4 is provided, the masking layer may be provided between the base material layer 1 and the primer layer 4, and when the pattern layer 5 is provided, the masking layer may be provided between the base material layer 1 and the pattern layer 5.

Further, in the first invention, a transparent resin layer 6 may be provided between the base material layer 1 and the surface layer 2 as necessary for the purpose of improving scratch resistance. When the primer layer 4 is provided, the transparent resin layer 6 may be provided between the pattern layer 5 and the primer layer 4.

Further, in the decorative sheet of the first invention, a back adhesive layer (not illustrated) may be provided on the back surface of the base material layer 1 (surface on a side opposite to the surface layer 2) as necessary for the purpose of improving adhesion with a molded resin in molding of a decorative resin molded article.

In the decorative sheet of the first invention, a resin layer 7 may be provided immediately below the surface layer 2 (on a side opposite to the thermoplastic resin film layer 30) for the purpose of, for example, improving scratch resistance, weather resistance and the like of a decorative resin molded article. When the resin layer 7 is provided, an adhesive agent layer (not illustrated) may be provided immediately below the resin layer 7 (on a side opposite to the surface layer 2) as necessary for the purpose of, for example, improving adhesion between the resin layer 7 and a layer situated thereunder.

Examples of the laminated structure of the decorative sheet of the first invention include a laminated structure in which the base material layer 1, the surface layer 2 and the thermoplastic resin film layer 30 are laminated in this order; a laminated structure in which the base material layer 1, the surface layer 2, the adhesive layer 31 and the thermoplastic resin film layer 30 are laminated in this order; a laminated structure in which the base material layer 1, the surface layer 2, the release layer 32, the adhesive layer 31 and the thermoplastic resin film layer 30 are laminated in this order; a laminated structure in which the base material layer 1, the pattern layer 5, the surface layer 2 and the thermoplastic resin film layer 30 are laminated in this order; a laminated structure in which the base material layer 1, the pattern layer 5, the surface layer 2, the adhesive layer 31 and the thermoplastic resin film layer 30 are laminated in this order; a laminated structure in which the base material layer 1, the pattern layer 5, the surface layer 2, the release layer 32, the adhesive layer 31 and the thermoplastic resin film layer 30 are laminated in this order; a laminated structure in which the base material layer 1, the pattern layer 5, the primer layer 4, the surface layer 2 and the thermoplastic resin film layer 30 are laminated in this order; a laminated structure in which the base material layer 1, the pattern layer 5, the primer layer 4, the surface layer 2, the adhesive layer 31 and the thermoplastic resin film layer 30 are laminated in this order; a laminated structure in which the base material layer 1, the pattern layer 5, the primer layer 4, the surface layer 2, the release layer 32, the adhesive layer 31 and the thermoplastic resin film layer 30 are laminated in this order; a laminated structure in which the base material layer 1, the pattern layer 5, the transparent resin layer 6, the primer layer 4, the surface layer 2 and the thermoplastic resin film layer 30 are laminated in this order; a laminated structure in which the base material layer 1, the pattern layer 5, the transparent resin layer 6, the primer layer 4, the surface layer 2, the adhesive layer 31 and the thermoplastic resin film layer 30 are laminated in this order; a laminated structure in which the base material layer 1, the pattern layer 5, the transparent resin layer 6, the primer layer 4, the surface layer 2, the release layer 32, the adhesive layer 31 and the thermoplastic resin film layer 30 are laminated in this order; a laminated structure in which the base material layer 1, the pattern layer 5, the transparent resin layer 6, the adhesive agent layer, the resin layer 7, the surface layer 2, the release layer 32, the adhesive layer 31 and the thermoplastic resin film layer 30 are laminated in this order; a laminated structure in which the pattern layer 5, the base material layer 1, the pattern layer 5, the transparent resin layer 6, the primer layer 4, the surface layer 2, the release layer 32, the adhesive layer 31 and the thermoplastic resin film layer 30 are laminated in this order; a laminated structure in which the base material layer 1, the pattern layer 5, the transparent resin layer 6, the surface layer 2, the primer layer 4, the surface layer 2, the release layer 32, the adhesive layer 31 and the thermoplastic resin film layer 30 are laminated in this order; and a laminated structure in which the base material layer 1, the pattern layer 5, the transparent resin layer 6, the primer layer 4, the resin layer 7, the surface layer 2, the release layer 32, the adhesive layer 31 and the thermoplastic resin film layer 30 are laminated in this order.

Figure 2:
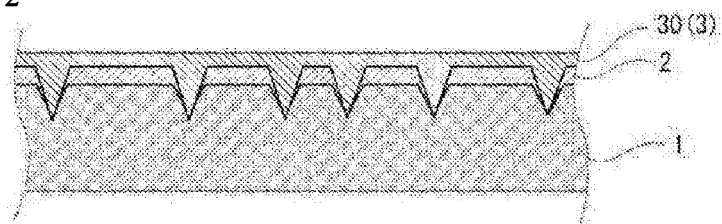
FIG. 2 is a schematic view of a cross section structure of one form of a decorative sheet of the first invention.
Figure 3:
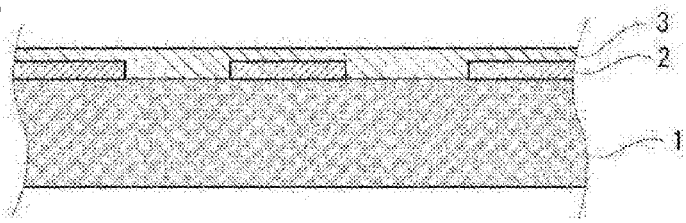
FIG. 3 is a schematic view of a cross section structure of one form of a decorative sheet of the first invention.
Figure 4:
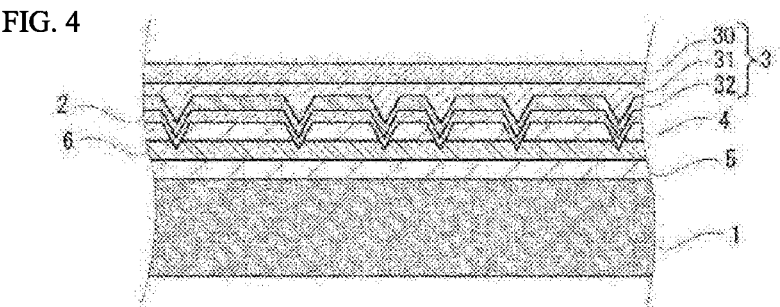
FIG. 4 is a schematic view of a cross section structure of one form of a decorative sheet of the first invention.
Figure 5:
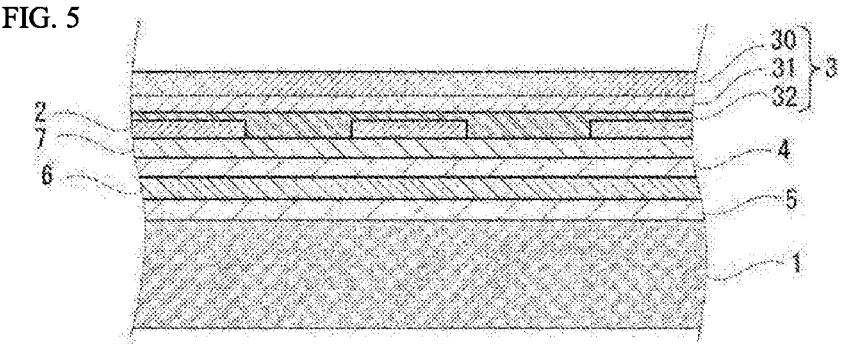
FIG. 5 is a schematic view of a cross section structure of one form of a decorative sheet of the first invention.

As one aspect of the laminated structure of the decorative sheet of the first invention, FIGS. 1 to 3 each show a sectional view of a decorative sheet in which the base material layer 1, the surface layer 2 and the thermoplastic resin film layer 30 are laminated in this order. As one aspect of the laminated structure of the decorative sheet of the first invention, FIG. 4 shows a sectional view of a decorative sheet in which the base material layer 1, the pattern layer 5, the transparent resin layer 6, the primer layer 4, the surface layer 2, the release layer 32, the adhesive layer 31 and the thermoplastic resin film layer 30 are laminated in this order. As one aspect of the laminated structure of the decorative sheet of the first invention, FIG. 5 shows a sectional view of a decorative sheet in which the base material layer 1, the pattern layer 5, the transparent resin layer 6, the primer layer 4, the resin layer 7, the surface layer 2, the release layer 32, the adhesive layer 31 and the thermoplastic resin film layer 30 are laminated in this order. As one aspect of the laminated structure of the decorative sheet of the first invention, FIG.

Figure 7:
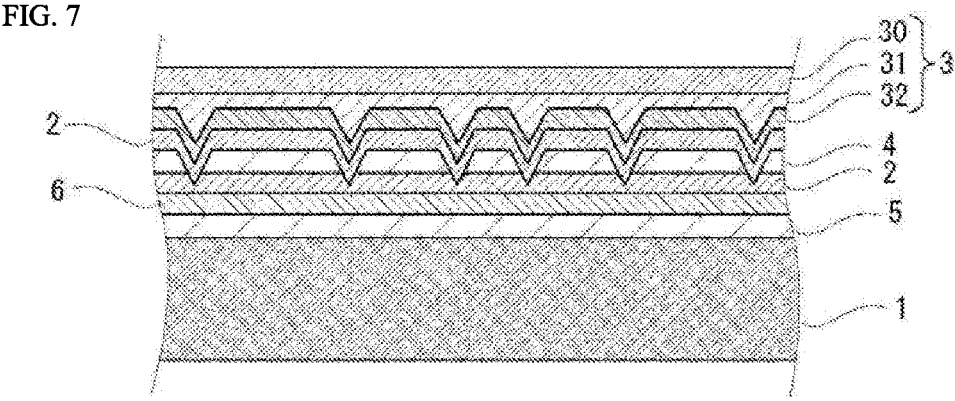
FIG. 7 is a schematic view of a cross section structure of one form of a decorative sheet of the first invention.

6 shows a sectional view of a decorative sheet in which the pattern layer 5, the base material layer 1, the pattern layer 5, the transparent resin layer 6, the primer layer 4, the surface layer 2, the release layer 32, the adhesive layer 31 and the thermoplastic resin film layer 30 are laminated in this order. As one aspect of the laminated structure of the decorative sheet of the first invention, FIG. 7 shows a sectional view of a decorative sheet in which the base material layer 1, the pattern layer 5, the transparent resin layer 6, the surface layer 2, the primer layer 4, the surface layer 2, the release layer 32, the adhesive layer 31 and the thermoplastic resin film layer 30 are laminated in this order.

The decorative sheet of the second invention has a laminated structure in which at least the surface layer 2 having an irregular shape and the releasable irregularity protective layer 3 are laminated.

The irregularity protective layer 3 includes an adhesive layer 34 filling recesses in the irregular shape of the surface layer 2, and a release film layer 33 in this order from the surface layer 2 side. In the irregularity protective layer 3, the release layer 32, the adhesive layer 34 and the release film layer 33 may be laminated in this order from the surface layer 2 side for the purpose of, for example, improving separability between the surface layer 2 and the irregularity protective layer 3. When the irregularity protective layer 3 has the release layer 32, the release layer 32 and the adhesive layer 34 fill recesses in the irregular shape of the surface layer 2 in the decorative sheet of the second invention.

In the decorative sheet of the second invention, the base material layer 1 may be provided as a support for the decorative sheet etc. on the surface layer 2 on a side opposite to the irregularity protective layer 3.

In the decorative sheet of the second invention, the primer layer 4 may be provided on the surface layer 2 on a side opposite to the irregularity protective layer 3 as necessary for the purpose of improving bondability between the layers.

The pattern layer 5 may be provided on the surface layer 2 on a side opposite to the irregularity protective layer 3 as necessary for the purpose of imparting decorativeness. When the base material layer 1 and the primer layer 4 are provided, the pattern layer 5 may be provided between the base material layer 1 and the primer layer 4.

When the base material layer 1 is provided, a masking layer (not illustrated) may be provided between the base material layer 1 and the surface layer 2 as necessary for the purpose of suppressing a change and variation in color of the base material layer 1. When the primer layer 4 is provided, the masking layer may be provided between the base material layer 1 and the primer layer 4, and when the pattern layer 5 is provided, the masking layer may be provided between the base material layer 1 and the pattern layer 5.

Further, the transparent resin layer 6 may be provided on the surface layer 2 on a side opposite to the irregularity protective layer 3 as necessary for the purpose of improving scratch resistance. When the primer layer 4 is provided, the transparent resin layer 6 may be provided between the pattern layer 5 and the primer layer 4.

Further, in the decorative sheet of the second invention, a back adhesive layer (not illustrated) may be provided on a surface of the surface layer 2 on a side opposite to the irregularity protective layer 3 as necessary for the purpose of improving adhesion with a molded resin in molding of a decorative resin molded article.

Figure 12:
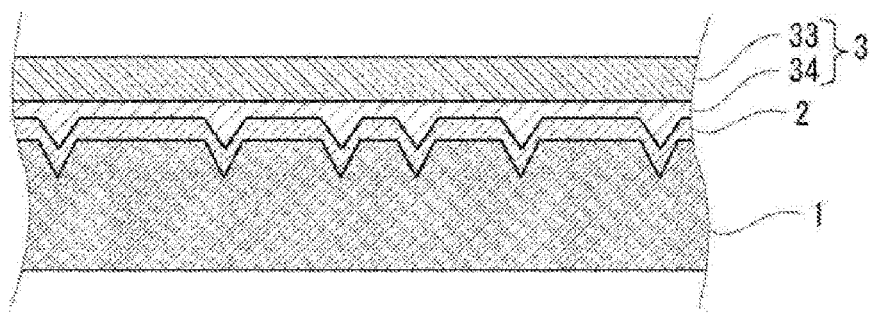
FIG. 12 is a schematic view of a cross section structure of one form of a decorative sheet of the second invention.

Examples of the laminated structure of the decorative sheet of the second invention include a laminated structure in which the surface layer 2, the irregularity protective layer 3 (adhesive layer 34/release film layer 33) are laminated in this order; a laminated structure in which the base material layer 1, the surface layer 2, the irregularity protective layer 3 (adhesive layer 34/release film layer 33) are laminated in this order; a laminated structure in which the base material layer 1, the pattern layer 5, the surface layer 2 and the irregularity protective layer 3 (adhesive layer 34/release film layer 33) are laminated in this order; a laminated structure in which the base material layer 1, the pattern layer 5, the primer layer 4, the surface layer 2 and the irregularity protective layer 3 (adhesive layer 34/release film layer 33) are laminated in this order; a laminated structure in which the base material layer 1, the pattern layer 5, the primer layer 4, the surface layer 2 and the irregularity protective layer 3 (release layer 32/adhesive layer 34/release film layer 33) are laminated in this order; and a laminated structure in which the base material layer 1, the pattern layer 5, the transparent resin layer 6, the primer layer 4, the surface layer 2 and the irregularity protective layer 3 (release layer 32/adhesive layer 34/release film layer 33) are laminated in this order. As one aspect of the laminated structure of the decorative sheet of the second invention, FIGS. 12 and 13 each show a sectional view of a decorative sheet in which the base material layer 1, the surface layer 2 and the irregularity protective layer 3 (adhesive layer 34/release film layer 33) are laminated in this order. As one aspect of the laminated structure of the decorative sheet of the second invention, FIG. 12 shows a sectional view of a decorative sheet in which the base material layer 1, the pattern layer 5, the transparent resin layer 6, the primer layer 4, the surface layer 2 and the irregularity protective layer 3 (release layer 32/adhesive layer 33/release film layer 33) are laminated in this order.

Compositions of Layers of Decorative Sheet

[Base Material Layer 1]

The base material layer 1 is a resin sheet (resin film) that serves as a support in the decorative sheet of the present invention (first and second inventions). The resin component to be used in the base material layer 1 is not particularly limited, and may be appropriately selected according to three-dimensional moldability and compatibility with a molded resin, but a resin film composed of a thermoplastic resin is preferable. Specific examples of the thermoplastic resin include acrylonitrile-butadiene-styrene resins (hereinafter, sometimes referred to as "ABS resins"); acrylonitrile-styrene-acrylic acid ester resins (hereinafter, sometimes referred to as "ASA resins"); acrylic resins; polyolefin resins such as polypropylene and polyethylene; polycarbonate resins; vinyl chloride resins; and polyethylene terephthalate (PET). Among them, ABS resins and acrylic resins are preferable from the viewpoint of three-dimensional moldability. The base material layer 1 may be formed of a single-layer sheet of the above-mentioned resin, or may be formed of a multi-layer sheet of the same resin or different resins.

The bending elastic modulus of the base material layer 1 is not particularly limited. For example, when the decorative sheet of the present invention is integrated with a molded resin by an insert molding method, the bending elastic modulus of the base material layer 1 in the decorative sheet of the present invention at 25° C. is 500 to 4,000 MPa, preferably 750 to 3,000 MPa. Here, the bending elastic modulus at 25° C. is a value measured in accordance with JIS K7171. When the bending elastic modulus at 25° C. is 500 MPa or more, the decorative sheet has sufficient rigidity, and has further improved surface properties and moldability when subjected to an insert molding method. When the bending elastic modulus at 25° C. is 3,000 MPa or less, a sufficient tension can be applied in production of the decorative sheet in a roll-to-roll process, so that sagging hardly occurs, and therefore pictures can be overlapped and printed without getting out of position, leading to improvement of so called picture registration.

One or both of the surfaces of the base material layer 1 may be subjected to a physical or chemical surface treatment such as an oxidation method or a roughening method as necessary for improving adhesion with a layer provided on the base material layer 1. Examples of the oxidation method that is carried out as a surface treatment of the base material layer 1 include corona discharge treatment, chromium oxidation treatment, flame treatment, hot air treatment and ozone and ultraviolet ray treatment methods. Examples of the roughening method that is carried out as a surface treatment of the base material layer 1 include sand blasting methods and solvent treatment methods. The surface treatment is appropriately selected according to a type of resin component that forms the base material layer 1, but a corona discharge treatment method is preferable from the viewpoint of an effect, handling characteristics and so on.

The base material layer 1 may be subjected to such a treatment that a known adhesive layer is formed.

The base material layer 1 may be colored with a colorant, or may be not colored. The base material layer 1 may be colorless and transparent, colored and transparent, or semi-transparent. The colorant to be used in the base material layer 1 is not particularly limited, but it is preferably a colorant that is not discolored even at a temperature of 150° C. or higher, and specific examples thereof include existing dry colorants, paste colorants and master batch resin compositions.

The thickness of the base material layer 1 is appropriately set according to a use purpose of the decorative sheet, a molding method for integration with a molded resin, or the like, but it is normally about 25 to 1000 µm, preferably about 50 to 700 µm. More preferably, when the decorative sheet of the present invention is subjected to an insert molding method, the thickness of the base material layer 1 is normally about 50 to 1000 µm, preferably 100 to 700 µm, further preferably 100 to 500µ. When the decorative sheet of the present invention is subjected to an injection molding simultaneous decorating method, the thickness of the base material layer 1 is normally 25 to 200 µm, preferably 50 to 200 µm, further preferably 70 to 200 µm.

[Surface Layer 2]

In the first invention, the surface layer 2 has an irregular shape, and is formed of a cured product of a curable resin composition (resin composition containing a curable resin). When the surface layer 2 having an irregular shape is formed of a cured product of a curable resin composition as described above, deformation and elimination of the irregular shape in lamination of the later-described thermoplastic resin film layer 30 on the surface layer 2 can be suppressed. Thus, by using the decorative sheet of the first invention, a decorative resin molded article can be obtained which is superior in design feeling and touch feeling to a decorative resin molded article obtained using a conventional decorative sheet in which a releasable thermoplastic resin film layer is laminated on a thermoplastic substrate sheet as a surface layer having an irregular shape. The surface layer 2 may include a plurality of layers. When the surface layer 2 is formed by a plurality of layers, for example, a plurality of surface layers 2 can be laminated with the primer layer 4 interposed between surface layers 2 as shown in, for example, FIG. 7. When the surface layer is formed by a plurality of layers, different functions can be imparted to the surface layers.

In the second invention, the surface layer 2 has an irregular shape, and is preferably formed of a cured product of a curable resin composition or a resin film.

<Irregular shape>

In the first and second inventions, the irregular shape formed on the surface layer 2 is not particularly limited, and may be appropriately set according to a design feeling, touch feeling or the like to be imparted. Examples of the irregular shape include hair-line pictures, wood-grain pictures and geometric pictures (dot, stripe and carbon).

The height of the projection, the width of the projection, the pitch between adjacent projections, the width of the recess, and the like in the irregular shape formed on the surface layer 2 may be appropriately set according to a design feeling, touch feeling or the like to be imparted.

For example, the center-line mean roughness (Ra) of the surface layer 2 is normally 1.0 to 20 µm, preferably 1.0 to 10 µm, further preferably 1.5 to 5 µm for imparting an excellent design feeling and touch feeling from an irregular shape. It is preferred that the center-line mean roughness of the surface layer 2 is 20 µm or less because scratching and breakage during transportation, rolling collapse and so on due to excessive sharpness of irregularities, for example, in storage of the decorative sheet in the form of a roll do not occur.

From the same point of view, the maximum height (Rmax) is normally 1.0 to 100 µm, preferably 1.0 to 80 µm, further preferably 1.0 to 60 µm. From the same point of view, the ten-point mean height (Rz) is normally 1.0 to 100 µm, preferably 1.0 to 80 µm, further preferably 1.0 to 60 µm. The center-line mean roughness (Ra), the maximum height (Rmax) and the ten-point mean height (Rz) are values each measured using a surface roughness/contour shape measurement apparatus.

In the first invention, the irregular shape formed by the surface layer 2 may be one in which the bottom of each recess is formed by the surface layer 2 as in the aspect shown in FIG. 1, or one in which a layer below the surface layer 2 is exposed to the bottom of each recess, and the surface layer 2 is partially provided to form projections as in the aspects shown in FIGS. 2 and 3. The former is preferred for protecting a surface of a decorative resin molded article. FIGS. 1 and 2 each show an irregular shape formed using, for example, a method in which embossing is performed as described later, and FIG. 3 shows an irregular shape formed using, for example, a method in which a resin composition for forming the surface layer 2 is applied to only portions (convex area layers) to be provided with projections, and is cured. In other words, in FIG. 3, the irregular shape of the surface layer 2 is formed by partially provided projections, and recesses in which a layer below the surface layer is exposed between the projections. FIGS. 1 to 3 each show a laminated structure in which the base material layer 1, the surface layer 2 and the releasable thermoplastic resin film layer 30 are laminated in this order for the sake of convenience.

For imparting an excellent design feeling and touch feeling, it is preferred that the decorative sheet is provided with the pattern layer 5, and recesses in the irregular shape formed by the surface layer 2 reach the pattern layer 5.

Figure 13:
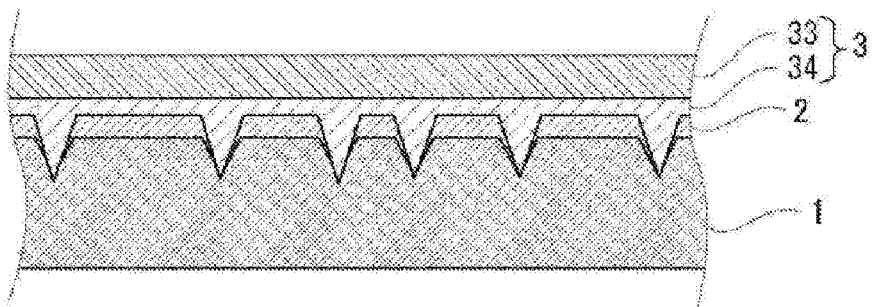
FIG. 13 is a schematic view of a cross section structure of one form of a decorative sheet of the second invention.
Figure 14:
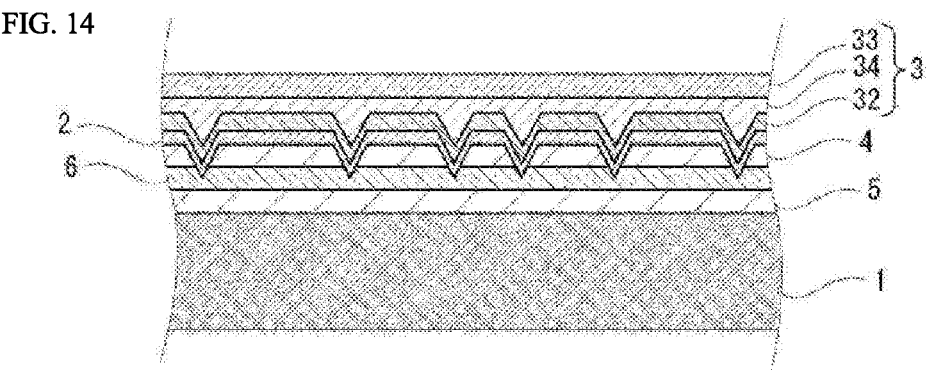
FIG. 14 is a schematic view of a cross section structure of one form of a decorative sheet of the second invention.

In the second invention, the irregular shape formed by the surface layer 2 may be one in which the bottom of each recess is formed by the surface layer 2 as in the aspect shown in FIG. 12, or one in which a layer below the surface layer 2 is exposed to the bottom of each recess, and a plurality of projections of the surface layer 2 are partially provided as in the aspect shown in FIG. 13. The former is preferred for protecting a surface of a decorative resin molded article. FIGS. 12 and 13 each show a laminated structure in which the base material layer 1, the surface layer 2 and the irregularity protective layer 3 are laminated in this order for the sake of convenience.

In the decorative sheets of the first and second inventions, the irregular shape may be formed in at least a partial region for imparting a high realistic design feeling from the irregular shape to the decorative sheet. In other words, in the decorative sheet of the present invention, an irregular shape that satisfies the above-mentioned relationship may be formed in a partial region, or formed in the whole region.

<Composition>

In a cured product of a curable resin composition for forming the surface layer 2 of the first invention, examples of the curable resin include thermosetting resins and ionizing radiation curable resins, and ionizing radiation curable resins are preferred. When the surface layer having an irregular shape is formed of a cured product of a resin composition containing an ionizing radiation curable resin, and the surface layer is covered with a thermoplastic resin film layer as described later, occurrence of deformation and elimination of the irregular shape during vacuum molding and injection molding can be suppressed to impart a particularly excellent design feeling and touch feeling to a decorative resin molded article.

Examples of the resin film for forming the surface layer 2 of the second invention include thermoplastic resin films. Examples of the thermoplastic resin include polyester resins such as polyethylene terephthalate (PET) and polyethylene naphthalate (PEN), and acryl-based resins, and acryl-based resins are preferred. When the surface layer 2 is formed of a resin film, the surface layer 2 normally has a self-standing property, and can serve as a support. Accordingly, in this case, the decorative sheet of the first invention is not required to include the base material layer 1.

In the first and second inventions, examples of the thermosetting resin include urethane resins and epoxy resins. The thermosetting resins may be used alone, or may be used in combination of two or more thereof. When a thermosetting resin is used, the surface layer 2 can be formed by laminating the thermosetting resin before curing, and heating and curing the thermosetting resin. The ionizing radiation curable resin is as follows.

(Ionizing Radiation Curable Resin)

In the first and second inventions, the ionizing radiation curable resin to be used for formation of the surface layer 2 is a resin that is crosslinked and cured when irradiated with an ionizing radiation. Here, the ionizing radiation means an electromagnetic wave or charged particle ray having an energy quantum capable of polymerizing or crosslinking a molecule, and normally an ultraviolet (UV) ray or an electron beam (EB) is used, but the ionizing radiations also include electromagnetic waves such as an X-ray and a γ-ray, and charged particle rays such as an α-ray and an ion beam. Among ionizing radiation curable resins, electron beam-curable resins are suitably used in formation of the surface layer 2 because they can be made solventless, do not require an initiator for photopolymerization, and exhibit stable curing characteristics.

Specific examples of the ionizing radiation curable resin include those in which prepolymers, oligomers and/or monomers having a polymerizable unsaturated bond or an epoxy group in the molecule are appropriately mixed.

As the oligomer to be used as an ionizing radiation curable resin, (meth)acrylate oligomers having a radical-polymerizable unsaturated group in the molecule are suitable, and among them, polyfunctional(meth)acrylate oligomers having two or more polymerizable unsaturated bonds in the molecule (di- or more functional) are preferable. Examples of the polyfunctional(meth)acrylate oligomer include polycarbonate(meth)acrylate, acrylic silicone (meth)acrylate, urethane(meth)acrylate, epoxy(meth) acrylate, polyester(meth)acrylate, polyether(meth)acrylate, polybutadiene(meth)acrylate, silicone(meth)acrylate, silicone-modified urethane(meth)acrylate and oligomers having a cation-polymerizable functional group in the molecule (e.g. novolac-type epoxy resins, bisphenol-type epoxy resins, aliphatic vinyl ethers, aromatic vinyl ethers and so on). Here, the polycarbonate(meth)acrylate is not particularly limited as long as it has a carbonate bond on the polymer main chain, and has a (meth)acrylate group at the end or side chain, and the polycarbonate(meth)acrylate can be obtained by esterifying a polycarbonate polyol with (meth)acrylic acid. The polycarbonate(meth)acrylate may be, for example, urethane(meth)acrylate having a polycarbonate backbone. The urethane(meth)acrylate having a polycarbonate backbone is obtained by, for example, reacting a polycarbonate polyol, a polyvalent isocyanate compound and hydroxy (meth)acrylate. The acrylic silicone(meth)acrylate can be obtained by radical-copolymerizing a silicone macro-monomer with a (meth)acrylate monomer. The urethane(meth) acrylate can be obtained by, for example, esterifying a polyurethane oligomer with (meth)acrylic acid, the polyurethane oligomer being obtained by reaction of a polyether polyol or a polyester polyol with a polyisocyanate. The epoxy(meth)acrylate can be obtained by, for example, reacting (meth)acrylic acid with an oxirane ring of a relatively low-molecular-weight bisphenol-type epoxy resin or novolac-type epoxy resin to perform esterification. Carboxyl-modified epoxy(meth)acrylate obtained by partially modifying the epoxy(meth)acrylate with a dibasic carboxylic anhydride can also be used. For example, the polyester (meth)acrylate can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether(meth)acrylate can be obtained by esterifying a hydroxyl group of a polyether polyol with (meth)acrylic acid. The polybutadiene(meth)acrylate can be obtained by adding(meth)acrylic acid to the side chain of a polybutadiene oligomer. The silicone(meth)acrylate can be obtained by adding(meth)acrylic acid to the end or side chain of a silicone having a polysiloxane bond in the main chain. The silicone-modified urethane(meth)acrylate is obtained by, for example, reacting a urethane prepolymer having an isocyanate group with hydroxy(meth)acrylate and a silicone compound having a silanol group. These oligomers may be used alone, or may be used in combination of two or more thereof.

As the monomer to be used as the ionizing radiation curable resin, (meth)acrylate monomers having a radical-polymerizable unsaturated group in the molecule are suitable, and among them, polyfunctional(meth)acrylate monomers are preferable. The polyfunctional(meth)acrylate monomer may be a (meth)acrylate monomer having two or more polymerizable unsaturated bonds in the molecule.

Specific examples of the polyfunctional(meth)acrylate monomer include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate and caprolactone-modified dipentaerythritol hexa(meth)acrylate. These monomers may be used alone, or may be used in combination of two or more thereof.

Among these ionizing radiation curable resins, oligomers having a polymerizable unsaturated bond or an epoxy group in the molecule are preferred, polycarbonate(meth)acrylate and acrylic silicone(meth)acrylate are further preferred, and polycarbonate(meth)acrylate is especially preferred for imparting a further excellent design feeling and touch feeling to a decorative resin molded article.

Among these ionizing radiation curable resins, combinations of (1) polycarbonate(meth)acrylate and (2) other polyfunctional(meth)acrylate (polyfunctional(meth)acrylate oligomer or monomer) are preferred; and combinations of (1) polycarbonate(meth)acrylate and (2) polyfunctional urethane(meth)acrylate are further preferred for imparting a particularly excellent design feeling and touch feeling.

When the ionizing radiation curable resin (1) and the ionizing radiation curable resin (2) are used in combination, the ratio of these ionizing radiation curable resins may be set considering the molecular weight, the number of functional groups and so on of each of the ionizing radiation curable resins, but for example, the mass ratio of the ionizing radiation curable resin (1) to the ionizing radiation curable resin (2) (ionizing radiation curable resin (1): ionizing radiation curable resin (2)) is preferably about 50:50 to 99:1, further preferably about 80:20 to 99:1, especially preferably about 85:15 to 99:1.

Hereinafter, polycarbonate(meth)acrylate and polyfunctional urethane(meth)acrylate that are each suitably used as an ionizing radiation curable resin for forming the surface protective layer 2 will be described in detail.

Polycarbonate(Meth)Acrylate

The polycarbonate(meth)acrylate is not particularly limited as long as it has a carbonate bond in the polymer main chain, and has(meth)acrylate at the end or side chain, and it may be, for example, a urethane(meth)acrylate having a polycarbonate backbone. In the (meth)acrylate, the number of functional groups per one molecule is preferably 2 to 6 for improvement of crosslinking and curing. The polycarbonate (meth)acrylate is preferably a polyfunctional polycarbonate (meth)acrylate having two or more(meth)acrylates at the end or on the side chain. The polycarbonate(meth)acrylates may be used alone, or may be used in combination of two or more thereof.

The polycarbonate(meth)acrylate is obtained by, for example, converting some or all of hydroxyl groups of a polycarbonate polyol into a (meth)acrylate (acrylic acid ester or methacrylic acid ester). The esterification reaction can be carried out by a usual esterification reaction. Examples thereof include 1) a method in which a polycarbonate polyol and an acrylic acid halide or methacrylic acid halide are condensed in the presence of a base; 2) a method in which a polycarbonate polyol and an acrylic anhydride or methacrylic anhydride are condensed in the presence of a catalyst; and 3) a method in which a polycarbonate polyol and an acrylic acid or methacrylic acid are condensed in the presence of an acid catalyst.

The polycarbonate polyol is a polymer having a carbonate bond in the polymer main chain, and having 2 or more, preferably 2 to 50, further preferably 3 to 50 hydroxyl groups at the end or side chain. A typical method for producing the polycarbonate polyol is a method using a polycondensation reaction of a diol compound (A), a polyhydric alcohol (B) of tri- or more valence, and a compound (C) as a carbonyl component.

The diol compound (A) which is used as a raw material of the polycarbonate polyol is represented by the general formula HO—$R^1$—OH. Here, $R^1$ is a divalent hydrocarbon group with a carbon number of 2 to 20, and may include an ether bond in the group. $R^1$ is, for example, a linear or branched alkylene group, a cyclohexylene group or a phenylene group.

Specific examples of the diol compound include ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-1,5-pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol and 1,4-cyclohexanedimethanol. These diols may be used alone, or may be used in combination of two or more thereof.

Examples of the tri- or higher polyhydric alcohol (B) which is used as a raw material of the polycarbonate polyol include alcohols such as trimethylolpropane, trimethylolethane, pentaerythritol, ditrimethylolpropane, dipentaerythritol, glycerin and sorbitol. The polyhydric alcohol of tri- or more valence may be an alcohol having a hydroxyl group with 1 to 5 equivalents of ethylene oxide, propylene oxide or another alkylene oxide added to the hydroxyl group of the polyhydric alcohol. These polyhydric alcohols may be used alone, or may be used in combination of two or more thereof.

The compound (C) as a carbonyl component which is used as a raw material of the polycarbonate polyol is any compound selected from a carbonic acid diester, phosgene and an equivalent thereof. Specific examples of the compound include carbonic acid diesters such as dimethyl carbonate, diethyl carbonate, diisopropyl carbonate, diphenyl carbonate, ethylene carbonate and propylene carbonate; phosgene; halogenated formic acid esters such as methyl chloroformate, ethyl chloroformate and phenyl chloroformate. These compounds may be used alone, or may be used in combination of two or more thereof.

The polycarbonate polyol is synthesized by subjecting the diol compound (A), the polyhydric alcohol (B) of tri- or more valence, and the compound (C) as a carbonyl component to a polycondensation reaction under general conditions. The charged molar ratio of the diol compound (A) and the polyhydric alcohol (B) may be set to, for example, 50:50 to 99:1. The charged molar ratio of the compound (C) as a carbonyl component to the diol compound (A) and the polyhydric alcohol (B) may be set to, for example, 0.2 to 2 equivalents with respect to hydroxyl groups of the diol compound and the polyhydric alcohol.

The equivalent number (eq./mol) of hydroxyl groups existing in the polycarbonate polyol after the polycondensation reaction with the above-mentioned charged ratio is, for example, 3 or more, preferably 3 to 50, further preferably 3 to 20 on average in one molecule. When such an equivalent number is satisfied, a necessary amount of (meth) acrylate groups are formed through an esterification reaction as described later, and moderate flexibility is imparted to the polycarbonate(meth)acrylate resin. The terminal functional groups of the polycarbonate polyol are usually OH groups, but some of them may be carbonate groups.

The method for producing a polycarbonate polyol as described above is described in, for example, Japanese Patent Laid-open Publication No. S64-1726. The polycarbonate polyol can also be produced through an ester exchange reaction of a polycarbonate diol and a polyhydric alcohol of tri- or more valence as described in Japanese Patent Laid-Open Publication No. H03-181517.

The molecular weight of the polycarbonate(meth)acrylate is not particularly limited, but it is, for example, 500 or more, preferably 1,000 or more, further preferably more than 2,000 in terms of a weight average molecular weight. The upper limit of the weight average molecular weight of the polycarbonate(meth)acrylate is not particularly limited, but it is, for example, 100,000 or less, preferably 50,000 or less for controlling the viscosity so as not to be excessively high. The weight average molecular weight of the polycarbonate (meth)acrylate is preferably more than 2,000 and not more than 50,000, further preferably 5,000 to 20,000 for further improving moldability.

The weight average molecular weight of the polycarbonate(meth)acrylate in this specification is a value obtained by performing measurement using a gel permeation chromatography method using polystyrene as a standard substance.

<Polyfunctional Urethane(Meth)Acrylate>

The polyfunctional urethane(meth)acrylate is not particularly limited as long as it has a urethane bond on the polymer main chain, and a (meth)acrylate at the end or on the side chain. Such urethane(meth)acrylate can be obtained by, for example, esterifying a polyurethane oligomer with (meth) acrylic acid, the polyurethane oligomer being obtained by reaction of a polyether polyol or a polyester polyol with a polyisocyanate. In the urethane(meth)acrylate, the number of functional groups per one molecule is preferably 2 to 12 for improvement of crosslinking and curing. The ionizing radiation curable resin composition to be used for formation of the surface layer 2 may further contain a urethane(meth) acrylate in addition to the polycarbonate(meth)acrylate. The urethane(meth)acrylates may be used alone, or may be used in combination of two or more thereof.

The molecular weight of the urethane(meth)acrylate is not particularly limited, but it is, for example, 2,000 or more, preferably 5,000 or more in terms of a weight average molecular weight. The upper limit of the weight average molecular weight of the urethane(meth)acrylate is not particularly limited, but it is, for example, 30,000 or less, preferably 10,000 or less for controlling the viscosity so as not to be excessively high.

The weight average molecular weight of the urethane (meth)acrylate in this specification is a value obtained by performing measurement using a gel permeation chromatography method using polystyrene as a standard substance.

<Silicon-Based Ionizing Radiation Curable Resin>

When a silicone-based ionizing radiation curable resin is contained as the ionizing radiation curable resin for forming the surface layer 2, an excellent design feeling and touch feeling can be imparted while the operation of separating the thermoplastic resin film layer 30 is facilitated in a decorative resin molded article.

The silicone-based ionizing radiation curable resin is not particularly limited, but acrylic silicone(meth)acrylate, silicone acrylate and silicone-modified urethane(meth)acrylate are preferred, and acrylic silicone(meth)acrylate is especially preferred. In the present invention, the "acrylic silicone(meth)acrylate" means a "compound in which in one molecule, a part of the structure of the acrylic resin is substituted with a siloxane bond (Si—O), and two or more (meth)acryloyloxy groups exist as functional groups at the side chain and/or the end of the main chain of the acrylic resin". The "silicone(meth)acrylate" means "modified silicone oil in which(meth)acryloyl groups are introduced at the side chain and both ends of silicone oil having polysiloxane as a main chain". Hereinafter, acrylic silicone(meth)acrylate, silicone(meth)acrylate and silicone-modified urethane (meth)acrylate that are preferred as the silicone-based ionizing radiation curable resin will be described in detail.

(Acrylic Silicone(Meth)Acrylate)

The acrylic silicone(meth)acrylate is not particularly limited as long as it is a compound in which in one molecule, a part of the structure of the acrylic resin is substituted with a siloxane bond (Si—O), and two or more(meth)acryloyloxy groups (acryloyloxy groups or methacryloyloxy groups) exist as functional groups at the side chain and/or the end of the main chain of the acrylic resin. As an example of the acrylic silicone(meth)acrylate, the structure of an acrylic resin having a siloxane bond at the side chain as disclosed in, for example, Japanese Patent Laid-open Publication No. 2007-070544.

The acrylic silicone(meth)acrylate for use in the present invention can be synthesized by radical-copolymerizing a silicone macro-monomer with a (meth)acrylate monomer in the presence of, for example, a radical polymerization initiator. Examples of the (meth)acrylate monomer include methyl(meth)acrylate, ethyl(meth)acrylate, propyl(meth) acrylate, butyl(meth)acrylate, 2-ethylhexyl(meth)acrylate and glycidyl(meth)acrylate. These (meth)acrylate monomers are used alone, or used in combination of two or more thereof.

A silicone macromonomer is synthesized by, for example, subjecting a hexaalkyl cyclotrisiloxane to living anion polymerization with n-butyllithium or lithium silanolate as a polymerization initiator, and capping the resultant polymer with a radical-polymerizable unsaturated group-containing silane. As the silicone macromonomer, a compound represented by the following formula (1) is preferably used.

[Chemical Formula 1]

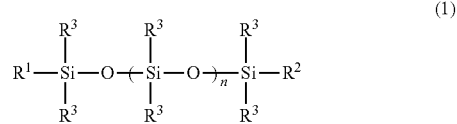

(1)

In the formula (1), $R^1$ represents an alkyl group with a carbon number of 1 to 4, preferably a methyl group or a n-butyl group. $R^2$ represents a mono valent organic group, preferably —CH=CH$_2$, —C$_6$H$_4$—CH=CH$_2$, —(CH$_2$)$_{30}$O (CO)CH=CH$_2$ or —(CH$_2$)$_3$O(CO)C(CH$_3$)=CH$_2$. $R^3$ may be the same or different, and each represent a hydrocarbon group with a carbon number of 1 to 6, preferably an alkyl group with a carbon number of 1 to 4, or a phenyl group, more preferably a methyl group. The value of n is not particularly limited, and for example, the number average molecular weight of the silicone macromonomer is preferably 1,000 to 30,000, more preferably 1,000 to 20,000.

For example, the acrylic silicone(meth)acrylate obtained using the above-mentioned raw materials has unit structures represented by the following formulae (2), (3) and (4).

[Chemical Formula 2]

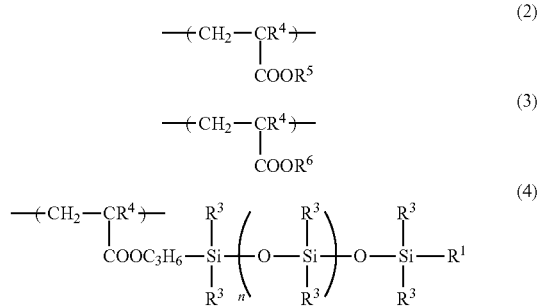

In the formulae (2), (3) and (4), $R^1$ and $R^3$ have the same meanings as those in FIG. 1), $R^4$ represents a hydrogen atom or a methyl group, $R^5$ represents an alkyl group or a glycidyl group in the (meth)acrylate monomer, or an alkyl group optionally having a functional group such as an alkyl group or a glycidyl group in the (meth)acrylate monomer, and $R^6$ represents an organic group having a (meth)acryloyloxy group. The above-described acrylic silicone(meth)acrylates are used alone, or used in combination of two or more thereof.

The molecular weight of the acrylic silicone(meth)acrylate is preferably 1,000 or more, more preferably 2,000 or more in terms of a weight average molecular weight measured by GPC analysis and calculated in terms of standard polystyrene. The upper limit of the weight average molecular weight of the acrylic silicone(meth)acrylate is not particularly limited, but it is preferably 150,000 or less, more preferably 100,000 or less for controlling the viscosity so as not to be excessively high. The weight average molecular weight of the acrylic silicone(meth)acrylate is especially preferably 2,000 to 100,000 for securing all of three-dimensional moldability, chemical resistance and scratch resistance.

The inter-crosslinking point average molecular weight of the acrylic silicone(meth)acrylate is preferably 100 to 2,500. An inter-crosslinking point average molecular weight of 100 or more is preferred from the viewpoint of three-dimensional moldability, and an inter-crosslinking point average molecular weight of 2,500 or less is preferred from the viewpoint of chemical resistance and scratch resistance. From the same point of view, the inter-crosslinking point average molecular weight of the acrylic silicone(meth)acrylate is more preferably 100 to 1,500, further preferably 100 to 1,000.

(Silicone(Meth)Acrylate)

The silicone(meth)acrylate is not particularly limited as long as it is modified silicone oil in which(meth)acryloyl groups are introduced at the side chain and both ends of silicone oil having polysiloxane as a main chain, and monofunctional or difunctional silicone(meth)acrylate, or polyfunctional (tri- or more functional) silicone(meth)acrylate can be used.

As the monofunctional or difunctional silicone(meth)acrylate, previously known silicone(meth)acrylate can be used, and the monofunctional or difunctional silicone(meth)acrylate is not particularly limited as long as it is modified silicone oil having one or two organic groups with the organic group being a (meth)acrylic group. The structure of the modified silicone oil is classified into a side-chain type, a both-end type, a single-end type and a side-chain and both-end type according to the binding position of the substituting organic group, and the binding position of the organic group is not particularly limited. As the silicone (meth)acrylate, silicone(meth)acrylate having a weight average molecular weight of preferably 1000 to 6000, more preferably 3000 to 6000, and a functional group equivalent (weight average molecular weight/number of functional groups) of preferably 500 to 3000, more preferably 1500 to 3000 is used.

As the polyfunctional (tri- or more functional) silicone (meth)acrylate to be used in the silicone(meth)acrylate, previously known polyfunctional silicone(meth)acrylate can be used, and the polyfunctional silicone(meth)acrylate is not particularly limited as long as it is modified silicone oil having two or more, preferably four or more, further preferably four to six organic groups with the organic group being a (meth)acrylic group. The structure of the modified silicone oil is classified into a side-chain type, a both-end type, a single-end type and a side-chain and both-end type according to the binding position of the substituting organic group, and the binding position of the organic group is not particularly limited. As the silicone(meth)acrylate, silicone (meth)acrylate having a weight average molecular weight of preferably 3000 to 100000, more preferably 10000 to 30000, and a functional group equivalent (weight average molecular weight/number of functional groups) of preferably 750 to 25000, more preferably 3000 to 6000 is used.

The weight average molecular weight of the silicone (meth)acrylate in this specification is a value obtained by performing measurement using a gel permeation chromatography method using polystyrene as a standard substance.

(Silicone-Modified Urethane(Meth)Acrylate)

The silicone-modified urethane(meth)acrylate is not particularly limited, and examples thereof include compounds in which a part of the side chain of urethane(meth)acrylate is modified with silicone. The silicone-modified urethane (meth)acrylate is obtained by, for example, reacting a urethane prepolymer having an isocyanate group with hydroxy (meth)acrylate and a silicone compound having a silanol group.

As the number of functional groups and the molecular weight of the silicone-modified urethane(meth)acrylate, for example, the number of functional groups per molecule is 1 to 10, preferably 2 to 8, further preferably 3 to 6, and the weight average molecular weight is 1000 to 50000, preferably 3000 to 30000, further preferably 5000 to 10000.

The ratio of the silicone-based ionizing radiation curable resin in the ionizing radiation curable resin for forming the surface layer 2 is preferably about 1 to 10% by mass, more preferably about 1 to 5% by mass, further preferably about 3 to 5% by mass.

<Other Additives>

According to desired properties to be imparted to the surface layer 2, various kinds of additives can be blended in curable resin composition to be used for formation of the surface layer 2. Examples of the additives include weather resistance improving agents such as ultraviolet absorbers and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents, colorants and wax. The additives can be appropriately selected from those that are commonly used. As the ultraviolet absorber and light stabilizer, a reactive ultraviolet absorber and light stabilizer having a polymerizable group such as a (meth)acryloyl group in the molecule can also be used. By blending wax, scratch resistance and abrasion resistance can be improved. The wax is preferably olefin wax such as polyethylene wax (PE wax). When wax is blended, the blending amount of the wax in the curable resin composition is preferably about 0.1 to 5% by mass, more preferably about 0.5 to 3% by mass.

<Thickness of Surface Layer 2>

The thickness of the surface layer 2 after curing is not particularly limited, but it is, for example, 0.01 to 200 μm, preferably 0.01 to 100 μm, further preferably 0.01 to 80 μm. When the thickness of the surface layer 2 after curing is in the above-mentioned range, an irregular shape can be further effectively displayed, so that an excellent design feeling and touch feeling can be imparted. For improving not only the design feeling and touch feeling but also the moldability of the decorative sheet, the thickness of the surface layer 2 after curing is preferably less than 50 μm, more preferably 0.01 to 40 μm, especially preferably 0.01 to 30 μm. When the irregular shape is formed by, for example, embossing as shown in, for example, FIGS. 1, 2 and 4, the thickness of the surface layer 2 after curing is preferably 0.01 to 20 μm, more preferably 0.01 to 15 μm, further preferably 0.01 to 12 μm for imparting a particularly excellent design feeling and touch feeling by effectively displaying the irregular shape. The thickness of the surface layer 2 is a thickness of the projection of the surface layer 2.

<Formation of Surface Layer 2>

In the first invention, the surface layer 2 may be formed on a predetermined layer in such a manner that a cured product of a curable resin composition has an irregular shape, and the specific method for forming the surface layer 2 is not particularly limited. Examples of the method for imparting an irregular shape to the surface layer 2 include a method in which embossing is performed; and a method in which a resin composition for forming the surface layer 2 is applied to only portions to be provided with projections, and is cured. For example, for imparting a fine irregular shape, a method in which embossing is performed (e.g. a first or second method as described later) is preferred. For varying the texture feelings and glosses of recesses and projections to obtain an irregularity design having a clearer contrast, a method in which a resin composition for forming the surface layer 2 is applied to only portions (convex area layers) to be provided with projections, and is cured (e.g. a third method as described later) is preferred.

Specific examples of the method for forming the surface layer 2 having an irregular shape include the following first to third methods.

First method: The base material layer 1, and other layers to be provided as necessary are sequentially laminated to prepare a sheet having layers other than the surface layer 2, a surface of the sheet, on which the surface layer 2 is to be laminated, is embossed, and then coated with a curable resin composition to be used for formation of the surface layer 2, and the curable resin composition is cured.

Second method: The base material layer 1, and other layers to be provided as necessary are sequentially laminated to prepare a sheet having layers other than the surface layer 2, a surface of the sheet, on which the surface layer 2 is to be laminated, is coated with a curable resin composition to be used for formation of the surface layer 2, the curable resin composition is cured, and the surface layer 2 side is then embossed.

Third method: The base material layer 1, and other layers to be provided as necessary are sequentially laminated to prepare a sheet having layers other than the surface layer 2, only portions to be provided with projections on a surface of the sheet, on which the surface layer 2 is to be laminated, are coated with a curable resin composition to be used for formation of the surface layer 2, and the curable resin composition is cured.

When a resin film is used as the surface layer 2 in the second invention, the surface layer 2 having an irregular shape can be formed by laminating the resin film on a layer situated blow the surface layer 2, and performing embossing from above the resin film.

When the surface layer 2 is formed using a curable resin composition in the second invention, the surface layer 2 may be formed on a predetermined layer in such a manner that a cured product of a curable resin composition has an irregular shape, and the specific method for forming the surface layer 2 is not particularly limited. Examples of the method for imparting an irregular shape to the surface layer 2 include a method in which embossing is performed; and a method in which a resin composition for forming the surface layer 2 is applied to only portions to be provided with projections, and is cured. A method in which embossing is performed is preferred.

When the surface layer 2 is formed using a curable resin composition in the second invention, specific examples of the method for forming the surface layer 2 having an irregular shape include the above-mentioned first to third methods.

In the first and second inventions, the method for coating a predetermined layer with a curable resin composition to be used for formation of the surface layer 2 is not particularly limited, and in the case of the first method or the second method, mention is made of, for example, gravure coating, bar coating, roll coating, reverse roll coating and comma coating, and gravure coating is preferred. In the case of the third method, mention is made of printing or coating methods such as silk screen printing, gravure build-up printing, rotary screen printing, and a shaping method using ionizing radiation curable resin with embossing cylinder as described in Japanese Patent Laid-open Publication No. 2002-240078.

The curable resin composition (uncured resin layer) applied onto a predetermined layer in the manner described above is irradiated with an ionizing radiation such as an electron beam or an ultraviolet ray to cure the resin composition, so that the surface layer 2 is formed. Here, when an electron beam is used as the ionizing radiation, an accelerating voltage thereof can be appropriately selected according to a resin to be used and a thickness of the layer, but the accelerating voltage is normally about 70 to 300 kV.

In irradiation of an electron beam, the transmission capacity increases as the accelerating voltage becomes higher, and therefore when a base material that is degraded by irradiation of an electron beam is used in the base material layer, an accelerating voltage is selected so that the transmission depth of the electron beam is substantially equal to the thickness of the resin layer, whereby the base material layer can be inhibited from being excessively irradiated with an electron beam, so that degradation of the base material by an excessive electron beam can be minimized The amount of radiation is preferably an amount with which the crosslinking density of the resin layer is saturated, and the amount of radiation is selected within a range of normally 5 to 300 kGy (0.5 to 30 Mrad), preferably 10 to 50 kGy (1 to 5 Mrad).

Further, the electron beam source is not particularly limited, and various kinds of electron beam accelerators can be used such as, for example, those of Cockcroft-Walton type, van de graaff type, tuned transformer type, insulated core transformer type, linear type, dynamitron type and high frequency type.

When an ultraviolet ray is used as the ionizing radiation, it is practical to radiate light including an ultraviolet ray having a wavelength of 190 to 380 nm. The ultraviolet ray source is not particularly limited, and examples thereof include high-pressure mercury lamps, low-pressure mercury lamps, metal halide lamps and carbon arc lamps.

[Thermoplastic Resin Film Layer 30]

In the first invention, the thermoplastic resin film layer 30 is a layer that is provided for suppressing deformation and elimination of the irregular shape of the surface layer 2 during vacuum molding and injection molding of the decorative sheet. The thermoplastic resin film layer 30 is a layer that is laminated releasably from the decorative sheet (surface layer 2), and separated after integral molding with a molded resin.

In the present invention, the "releasable" thermoplastic resin film layer means that the thermoplastic resin film layer can be separated from the surface layer having an irregular shape, specifically means that it can be separated without collapsing the irregular shape. For example, when the adhesive strength in peeling of the surface layer and the thermoplastic resin film layer from each other in a measurement method specified in and conforming to JIS Z0237, "10. Measurement of Adhesive Strength 10.4.1 Adhesive Strength in 180° Peeling from Test Plate" is about 0.01 to 20 N/25 mm, the thermoplastic resin film layer can be sufficiently separated. The adhesive strength is preferably about 0.01 to 20 N/25 mm, more preferably about 0.02 to 10 N/25 mm, further preferably about 0.05 to 5 N/25 mm. When the adhesive strength is less than 0.01 N/25 mm, the thermoplastic resin film layer may be suddenly separated from the surface layer before or during molding of the decorative sheet. When the adhesive strength is more than 20 N/25 mm, the thermoplastic resin film layer may be broken in separation of the thermoplastic resin film layer, and partially left on a molded resin layer, or the surface layer may be partially peeled together with the thermoplastic resin film layer, leading to collapse or deformation of the surface layer, depending on the thickness of the thermoplastic resin film layer and the tensile strength of the resin.

In the first invention, the thermoplastic resin film layer 30 and the surface layer 2 may be laminated directly with each other, or other layer may be laminated between these layers. When the thermoplastic resin film layer 30 and the surface layer 2 are laminated directly, the thermoplastic resin film layer 30 serves as an irregularity protective layer 3 that protects the irregular shape of the surface layer 2.

When the surface layer 2 and the thermoplastic resin film layer 30 are laminated directly in the first invention, it is preferred that the thermoplastic resin film layer 30 fills at least some of recesses in the irregular shape of the surface layer 2. When the thermoplastic resin film layer 30 fills recesses in the irregular shape of the surface layer 2, the function of protecting the irregular shape of the surface layer 2 by the thermoplastic resin film layer 30 can be further improved.

In the first invention, examples of the method for filling recesses in the irregular shape of the surface layer 2 by the thermoplastic resin film layer 30 include a method in which the thermoplastic resin film layer 30 is laminated by extrusion molding or heat lamination so as to fill recesses in the irregular shape of the surface layer 2. In the decorative sheet of the first invention, the surface layer 2 is formed of a cured product of a curable resin composition. Accordingly, when the thermoplastic resin film layer 30 is laminated by heat lamination or extrusion molding, deformation of the irregular shape by heating is suppressed as compared to a decorative sheet having on a surface thereof a thermoplastic resin film provided with an irregular shape.

Further, in the decorative sheet of the first invention, the irregular shape of the surface layer 2 is protected by the thermoplastic resin film layer 30, and therefore the decorative sheet of the first invention is superior in moldability in injection molding or preceding premolding (vacuum molding) to a decorative sheet in which the irregular shape is protected by a resin layer composed of a cured product of a curable resin. Further, deformation of the irregular shape is sufficiently suppressed, and workability during separation is improved, so that even when the thickness of the thermoplastic resin film layer 30 is increased, moldability is more hardly impaired as compared to a case where a cured product of a curable resin is used as a protective layer for the irregular shape. Accordingly, the decorative sheet of the first invention can be suitably used as a decorative sheet that is required to have high three-dimensional moldability.

In the first invention, it is preferred that the thermoplastic resin film layer 30 is laminated by extrusion molding for adjusting the bonding strength so that the thermoplastic resin film layer 30 and the surface layer 2 are in close contact with each other in the state of a decorative sheet, and can be easily separated from each other after integral molding with a molded resin.

When other layer is laminated between the thermoplastic resin film layer 30 and the surface layer 2 in the first invention, the other layer and the thermoplastic resin film layer 30 can serve as the irregularity protective layer 3. Examples of the other layer include the later-described adhesive layer 31 and release layer 32.

When the adhesive layer 31 is laminated between the thermoplastic resin film layer 30 and the surface layer 2 in the first invention, it is preferred that after the later-described adhesive layer 31 is formed, the thermoplastic resin film layer 30 formed beforehand is laminated under the bonding strength or adhesive strength of the adhesive layer 31 for suppressing deformation or elimination of the irregular shape of the surface layer 2 during formation of the thermoplastic resin film layer 30. When the adhesive layer 31 is formed of an adhesive, the adhesive layer 31 can be formed by applying an adhesive onto the surface layer 2 having an irregular shape. Accordingly, formation of the adhesive layer 31 does not require heating with extrusion molding or heat lamination. Thus, when the adhesive layer 31 is formed of an adhesive, the thermoplastic resin film layer 30 for protecting the irregular shape of the surface layer 2 can be laminated while the fine irregular shape of the surface layer 2 is suitably maintained.

In the first invention, the thermoplastic resin for forming the thermoplastic resin film layer 30 is not particularly limited, and examples thereof include acrylonitrile-butadiene-styrene resins (hereinafter, sometimes referred to as "ABS resins"); acrylonitrile-styrene-acrylic acid ester resins; acrylic resins; polyolefin-based resins such as polypropylene and polyethylene; polycarbonate resins; polyvinyl chloride-based resins; and polyester resins such as polyethylene terephthalate (PET) resins and polybutylene terephthalate (PBT) resins. One or two or more of the thermoplastic resins may be contained.

It is known that when a decorative resin molded article is produced by an injection molding method in the first invention, a phenomenon of so called gate flow may occur in which the surface layer, the pattern layer or the like in the decorative sheet is melted by a high-temperature injected resin mainly at an injected resin injection site, leading to impairment of the design property. For reducing the gate flow, it is effective that heat applied to the decorative sheet is dissipated into a female die of an injection die (a side on which the die is in contact with a surface of the decorative sheet), but in the case of a decorative sheet in which a thermoplastic resin film layer that is ultimately separated from a decorative resin molded article exists between a female die and a surface layer or pattern layer that is ultimately left in the decorative resin molded article as in the first invention, heat applied to the surface layer or pattern layer is hardly dissipated into the female mold, so that the gate flow may easily occur. When in injection molding simultaneous decorating method, the decorative sheet is heated and softened in a mold, and then suctioned in vacuum to pre-mold the decorative sheet, the thermoplastic resin film layer may be excessively softened, and suctioned into a suction hole for vacuum suction which is provided in the female mold, leading to clogging of the hole, or film debris may be accumulated in the hole. For suppressing these problems, the thermoplastic resin film layer is preferably a layer containing a noncrystalline polyester resin. The noncrystalline polyester resin is superior in heat resistance to polyethylene etc., so that occurrence of the gate flow can be reduced, or suction of the thermoplastic resin film layer into the suction hole can be suppressed. Further, the noncrystalline polyester resin is more flexible than a crystalline polyester resin, so that three-dimensional moldability of the decorative sheet can be secured.

In the first invention, it is preferred to use noncrystalline polyethylene terephthalate (PET) as the noncrystalline polyester resin. As the noncrystalline PET, a resin generally known as A-PET or PET-G can be used.

In the first invention, the thickness of the thermoplastic resin film layer 30 is not particularly limited, but it is preferably about 5 to 300 μm, more preferably about 5 to 100 μm. When the irregular shape is formed by, for example, embossing as shown in, for example, FIGS. 1, 2 and 4, the thickness of the thermoplastic resin film layer 30 is preferably about 5 to 100 μm, more preferably about 20 to 50 μm for imparting a particularly excellent design feeling and touch feeling by effectively displaying the irregular shape. The thermoplastic resin film layer 30 may include a plurality of layers.

(Adhesive Layer 31)

In the first invention, the adhesive layer 31 is a layer that is provided between the thermoplastic resin film layer 30 and the surface layer 2 as necessary. The adhesive layer 31 is formed of an adhesive or a pressure sensitive adhesive. When the adhesive layer 31 formed of an adhesive is laminated in the first invention, the adhesive layer 31 fills recesses in the irregular shape of the surface layer 2.

In the first invention, the adhesive to be used in the adhesive layer 31 is not particularly limited as long as it can be applied so as to fill the irregular shape of the surface layer 2, and can be separated from a surface of the surface layer 2 together with the thermoplastic resin film layer 30, and a curable resin is preferably used. Examples of the curable resin include urethane-based adhesives, acryl-based adhesives, epoxy-based adhesives and rubber-based adhesives, and among them, urethane-based adhesives are preferred because sufficient bonding strength even during injection molding can be maintained, and the adhesive can be separated from a surface of the surface layer 2. Examples of the urethane-based adhesive include two-liquid curable urethane resin-based adhesives, and the two-liquid curable urethane resin-based adhesive is an adhesive using a two-liquid curable urethane resin containing various kinds of hydroxyl group-containing compounds such as polyether polyol, polyester polyol and acrylic polyol and various kinds of polyisocyanate compounds such as tolylene diisocyanate and hexamethylene diisocyanate.

When a pressure sensitive adhesive is used in the adhesive layer 31 in the first invention, a pressure sensitive adhesive sheet obtained by applying a pressure sensitive adhesive onto the thermoplastic resin film layer 30 can be used. Examples of the pressure sensitive adhesive sheet include pressure sensitive adhesive sheets obtained by applying an acryl-based pressure sensitive adhesive to a general polypropylene base material.

In the first invention, the thickness of the adhesive layer 31 is not particularly limited, but it is preferably about 5 to 70 μm, more preferably about 15 to 60 μm. The thickness of the adhesive layer 31 is the thickness of a portion situated above the projections of a layer (surface layer 2 or release layer 32) situated below the adhesive layer 31.

When the adhesive layer 31 is formed of an adhesive in the first invention, the adhesive layer 31 can be formed by applying the adhesive onto a layer (surface layer 2 or release layer 32) situated below the adhesive layer 31. Specifically, the adhesive may be applied to a surface of the surface layer 2 (surface of the release layer 32 if the decorative sheet includes the release layer 32) using a method such as gravure coating, bar coating, roll coating, reverse roll coating or comma coating.

[Irregularity Protective Layer 3 in Second Invention]

The irregularity protective layer 3 in the second invention is a layer that is provided on the surface layer 2 while being in contact with the surface layer 2. The irregularity protective layer 3 is laminated releasably from the interface with the surface layer 2, and separated after integral molding with a molded resin. In the second invention, the irregularity protective layer 3 includes an adhesive layer 31 filling recesses in the irregular shape of the surface layer 2, and a release film layer 33 in this order from the surface layer 2 side.

In the second invention, the adhesive layer 31 of the irregularity protective layer 3 is formed of an adhesive, and can be formed by applying an adhesive onto the surface layer 2 having an irregular shape. Accordingly, formation of adhesive layer does not require heating with extrusion molding or heat lamination as is required for formation of the cushion layer disclosed in Patent Document 1. Thus, in the second invention, the irregularity protective layer 3 for protecting the irregular shape of the surface layer 2 can be formed while the fine irregular shape of the surface layer 2 is suitably maintained.

(Adhesive Layer 31 in Second Invention)

The adhesive to be used in the adhesive layer 31 for the irregularity protective layer 3 in the second invention is not particularly limited as long as it can be applied so as to fill the irregular shape of the surface layer 2, and can be separated from a surface of the surface layer 2 together with the release film layer 33, and a curable resin is preferably used. Examples of the curable resin include urethane-based adhesives, acryl-based adhesives, epoxy-based adhesives and rubber-based adhesives, and among them, urethane-based adhesives are preferred because sufficient bonding strength even during injection molding can be maintained, and the adhesive can be separated from a surface of the surface layer 2. Examples of the urethane-based adhesive include two-liquid curable urethane resin-based adhesives, and the two-liquid curable urethane resin-based adhesive is an adhesive using a two-liquid curable urethane resin containing various kinds of hydroxyl group-containing compounds such as polyether polyol, polyester polyol and acrylic polyol and various kinds of polyisocyanate compounds such as tolylene diisocyanate and hexamethylene diisocyanate.

In the second invention, the thickness of the adhesive layer 31 is not particularly limited, but it is preferably about 5 to 70 µm, more preferably about 15 to 60 µm. The thickness of the adhesive layer 31 is the thickness of a portion situated above the projections of a layer (surface layer 2 or release layer 32) situated below the adhesive layer 31.

In the second invention, the adhesive layer 31 can be formed by applying the adhesive onto a layer (surface layer 2 or release layer 32) situated below the adhesive layer 31. Specifically, the adhesive may be applied to a surface of the surface layer 2 (surface of the release layer 32 if the decorative sheet includes the release layer 32) using a method such as gravure coating, bar coating, roll coating, reverse roll coating or comma coating.

(Release Film Layer 33 in Second Invention)

In the second invention, the release film layer 33 forms the irregularity protective layer 3 together with the adhesive layer 31. The release film layer 33 is a layer that is provided for suppressing deformation and elimination of the irregular shape of the surface layer 2 during vacuum molding and injection molding of the decorative sheet.

The material of the release film layer 33 in the second invention is not particularly limited, and for example, it may be preferably the same material as the thermoplastic resin (including an amorphous polyester resin) shown as an example for the thermoplastic resin film layer 30 in the first invention.

The thickness of the release film layer 33 in the second invention is not particularly limited, but it is preferably about 5 to 100 µm, more preferably about 20 to 50 µm.

(Release Layer 32)

In the first and second inventions, the release layer 32 is a layer that is provided as necessary for the purpose of, for example, improving separability between the thermoplastic resin film layer 30 and the surface layer 2. The release layer 32 is provided in such a manner that it is in contact with the surface layer 2. When the release layer 32 is laminated in the present invention, the release layer 32 fills recesses in the irregular shape of the surface layer 2. When the release layer 32 and the adhesive layer 31 formed of an adhesive are laminated, the release layer 32 and the adhesive layer 31 fill recesses in the irregular shape of the surface layer 2 in the decorative sheet of the present invention.

The material for forming the release layer 32 is not particularly limited as long as it can be applied so as to fill the irregular shape of the surface layer 2, and can be separated from a surface of the surface layer 2 together with the thermoplastic resin film layer 30, but it is preferred that the release layer 32 is formed of a cured product of an ionizing radiation curable resin composition. Accordingly, an excellent design feeling and touch feeling can be imparted to a decorative resin molded article by further effectively suppressing deformation and elimination of the irregular shape of the surface layer 2 during vacuum molding and injection molding.

<Ionizing Radiation Curable Resin in Release Layer 32>

The type, the preferred choice and the like of the ionizing radiation curable resin to be used for formation of the release layer 32 are the same as in the case of ionizing radiation curable resin used for formation of the surface layer 2. In particular, among ionizing radiation resins, the combination of the ionizing radiation curable resin (1) and the ionizing radiation curable resin (2) shown in the section for the surface layer 2 is suitably used in the release layer 32 because not only an action of suppressing deformation and elimination of the irregular shape of the surface layer 2 during vacuum molding and injection molding but also easy separability in separation after integral molding with a molded resin can be imparted. The ionizing radiation curable resin in the release layer 32 is preferably trifunctional pentaerythritol acrylate. The types of the ionizing radiation curable resin to be used for formation of the release layer 32 and the ionizing radiation curable resin to be used for formation of the surface layer 2 may be the same, or different.

<Other Additive Components>

The ionizing radiation curable resin composition to be used for formation of the release layer 32 may contain, in addition to the ionizing radiation curable resin, other resin components as necessary for improvement of moldability, etc. Examples of the resin components other than the ionizing radiation curable resin include thermoplastic resins such as acrylic resins; polyvinyl acetal (butyral resins) such as polyvinyl butyral; polyester resins such as polyethylene terephthalate and polybutylene terephthalate; vinyl chloride resins; urethane resins; polyolefins such as polyethylene and polypropylene; styrene-based resins such as polystyrene and α-methylstyrene; polyamide; polycarbonate; acetal resins such as polyoxymethylene; fluororesins such as ethylene-ethylene tetrafluoride copolymers; polyimide; polylactic acid; polyvinyl acetal resins; and liquid-crystalline polyester resins. These resin components may be used alone, or may be used in combination of two or more thereof.

The release layer 32 can be formed using, in addition to the ionizing radiation curable resin composition, the following resins alone or a resin composition obtained by mixing two or more thereof: thermoplastic resins such as silicone-based resins, fluorine-based resins, acryl-based resins (including, for example, acryl-melamine-based resins), polyester-based resins, polyolefin-based resins, polystyrene-based resins, polyurethane-based resins, cellulose-based resins, vinyl chloride-vinyl acetate-based copolymer resins and cellulose nitrate; copolymers of monomers that form the thermoplastic resins; and (meth)acrylic acid or urethane-modified products of these resins. Among them, acryl-based resins, polyester-based resins, polyolefin-based resins, polystyrene-based resins, copolymers of monomers that form these resins, and urethane-modified products thereof are preferable, and more specific examples include acryl-melamine-based resins alone, acryl-melamine-based resin-containing compositions, resin compositions obtained by mixing a polyester-based resin with a urethane-modified product of a copolymer of ethylene and acrylic acid, and resin compositions obtained by mixing an acryl-based resin with an emulsion of a copolymer of styrene and acryl. It is especially preferable that the release layer 32 be formed of an acryl-melamine-based resin alone, or a composition containing 50% by mass or more of an acryl-melamine-based resin among the above-mentioned resins.

In consideration of desired properties to be imparted to the release layer 32, various kinds of additives can be blended in the resin composition for forming the release layer 32. Examples of the additives include weather resistance improving agents such as ultraviolet absorbers and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents and colorants. The additives can be appropriately selected from those that are commonly used. As the ultraviolet absorber and light stabilizer, a reactive ultraviolet absorber and light stabilizer having a polymerizable group such as a (meth)acryloyl group in the molecule can also be used.

The thickness of the release layer 32 is not particularly limited, but it is preferably about 1 to 40 μm, more preferably about 5 to 15 μm. The thickness of the release layer 32 is the thickness of a portion situated above the projections of the surface layer 2.

The release layer 32 can be formed by applying the resin composition onto the surface layer 2. Specifically, the resin composition may be applied to a surface of the surface layer 2 using a method such as gravure coating, bar coating, roll coating, reverse roll coating or comma coating.

[Primer Layer 4]

In the first and second inventions, the primer layer 4 is a layer that is provided as necessary for the purpose of, for example, inhibiting occurrence of fine cracks and whitening in the stretched portion of the surface layer 2. In this case, the primer layer 4 is provided between the base material layer 1 and the surface layer 2, or between the pattern layer 5 and the surface layer 2 and/or between the base material layer 1 and the pattern layer 5, etc. when the pattern layer 5 is provided.

Preferably, the primer layer 4 is provided immediately below the surface layer 2 (immediately below the resin layer 7 when the resin layer 7 is formed of a curable resin) for improving adhesion between the surface layer 2 and a layer situated below the surface layer 2.

As a primer composition that forms the primer layer 4, one having a urethane resin, a (meth)acrylic resin, a (meth) acryl-urethane copolymer resin, a vinyl chloride-vinyl acetate copolymer, a polyester resin, a butyral resin, chlorinated polypropylene, chlorinated polyethylene or the like as a binder resin is preferably used, and these resins can be used alone, or in combination of two or more thereof. Among these resins, urethane resins, (meth)acrylic resins and (meth)acryl-urethane copolymer resins are preferable.

As the urethane resin, a polyurethane having a polyol (polyhydric alcohol) as a main agent and an isocyanate as a crosslinker (curing agent) can be used. As the polyol, one having two or more hydroxyl groups in the molecule, for example polyester polyol, polyethylene glycol, polypropylene glycol, acryl polyol, polyether polyol or the like is used. As the isocyanate, polyvalent isocyanate having two or more isocyanate groups in the molecule; an aromatic isocyanate such as 4,4-diphenylmethane diisocyanate; or aliphatic (or cycloaliphatic) isocyanates such as hexamethylene diisocyanate, isophorone diisocyanate, hydrogenated tolylene diisocyanate or hydrogenated diphenylmethane diisocyanate is used. A urethane resin and a butyral resin can be mixed to form the primer layer.

From the viewpoint of adhesion with the surface layer 2 after crosslinking, inhibition of interaction after lamination of the surface layer 2, physical properties and moldability, it is preferred to combine acryl polyol or polyester polyol as a polyol and hexamethylene diisocyanate or 4,4-diphenylmethane diisocyanate as a crosslinker, and particularly, it is preferable to use acryl polyol and hexamethylene diisocyanate in combination.

Examples of the (meth)acrylic resin include homopolymers of a (meth)acrylic acid ester, copolymers of two or more different (meth)acrylic acid ester monomers, and copolymers of a (meth)acrylic acid ester and another monomer, and specifically, (meth)acrylic resins composed of homopolymers or copolymers including (meth)acrylic acid esters such as polymethyl(meth)acrylate, polyethyl(meth)acrylate, polypropyl(meth)acrylate, polybutyl(meth)acrylate, methyl (meth)acrylate-butyl(meth)acrylate copolymers, ethyl (meth)acrylate-butyl(meth)acrylate copolymers, ethylene-methyl(meth)acrylate copolymers and styrene-methyl(meth) acrylate copolymers are suitably used.

For example, the (meth)acryl-urethane copolymer resin is preferably an acryl-urethane (polyester urethane) block copolymer-based resin. As the curing agent, the various kinds of isocyanates described above are used. The acryl/urethane ratio (mass ratio) in the acryl-urethane (polyester urethane) block copolymer-based resin is adjusted to fall within the range of preferably 9/1 to 1/9, more preferably 8/2 to 2/8.

The thickness of the primer layer 4 is not particularly limited, but it is, for example, about 0.5 to 20 μm, preferably 1 to 5 μm.

The primer layer 4 is formed by a normal coating method such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, pour coating, blushing or spray coating, or a transfer coating method using a primer composition. Here, the transfer coating method is a method in which a coating film of the primer layer or the adhesive layer is formed on a thin sheet (film base material), and thereafter the intended surface of the layer in the decorative sheet is coated with the coating film.

[Pattern layer 5]

Figure 6:
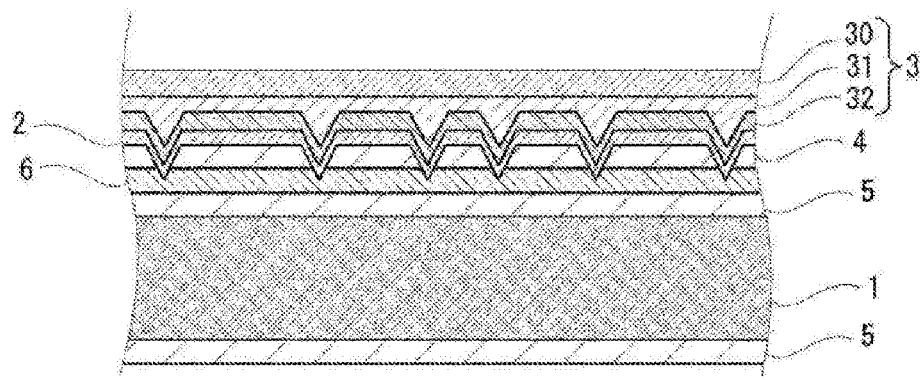
FIG. 6 is a schematic view of a cross section structure of one form of a decorative sheet of the first invention.

In the first and second inventions, the pattern layer 5 can be provided between the base material layer 1 and the surface layer 2 or on the base material layer 1 on a side opposite to the surface layer 2 as necessary for the purpose of imparting decorativeness to the decorative sheet. The pattern layer 5 can be provided as necessary between the base material layer 1 and the primer layer 4 when the primer layer 4 is provided, or between the masking layer and the surface layer 2 when the masking layer is provided. A plurality of pattern layers 5 may be provided as shown in FIG. 6.

The pattern layer 5 may be, for example, a layer which is provided with a desired picture using an ink composition. As an ink composition to be used for formation of the pattern layer 5, one obtained by appropriately mixing a binder with a colorant such as a pigment or a dye, an extender, a solvent, a stabilizer, a plasticizer, a catalyst, a curing agent and so on is used.

The binder to be used in the ink composition is not particularly limited, and examples thereof include polyurethane resins, vinyl chloride-vinyl acetate copolymer resins, vinyl chloride-vinyl acetate-acrylic copolymer resins, chlorinated polypropylene resins, acrylic resins, polyester resins, polyamide resins, butyral resins, polystyrene resins, nitrocellulose resins and cellulose acetate resins. These binders may be used alone, or may be used in combination of two or more thereof.

The colorant to be used in the ink composition is not particularly limited, and examples thereof include inorganic pigments such as carbon black (ink black), iron black, titanium white, antimony white, chrome yellow, titanium yellow, rouge, cadmium red, ultramarine and cobalt blue, organic pigments or dyes such as quinacridone red, isoindolinone yellow and phthalocyanine blue, metallic pigments composed of scale-like foil pieces of aluminum, brass or the like, and pearlescent (pearl) pigments composed of scale-like foil pieces of titanium dioxide-coated mica, basic lead carbonate or the like.

The picture formed by the pattern layer 5 is not particularly limited, and examples thereof include wood-grain pictures, rift pictures resembling a surface of rock, such as marble pictures (e.g., travertine marble pictures), textile pictures resembling texture or fabric pictures, tiling pictures and brick masonry pictures, and may also include pictures formed by combining these pictures, such as those of wooden mosaics and patchworks, and unicolor plains (total solids). These pictures are formed by multicolor printing with usual process colors of yellow, red, blue and black, and can be formed by multicolor printing etc. with spot colors, which is performed using plates of individual colors that constitute pictures.

The thickness of the pattern layer is not particularly limited, but it is, for example, 1 to 30 μm, preferably 1 to 20 μm.

The pattern layer 5 may be a thin metal film layer. Examples of the metal for forming the thin metal film layer include tin, indium, chromium, aluminum, nickel, copper, silver, gold, platinum, zinc and an alloy containing at least one of these metals. The method for forming a thin metal film layer is not particularly limited, and examples thereof include a vapor deposition method such as a vacuum vapor deposition method, a sputtering method and an ion plating method each using the above-mentioned metal. The thin metal film layer may be provided over the whole surface, or partially provided. For improving adhesion with the adjacent layer, the surface or back surface of the thin metal film layer may be provided with a primer layer using a known resin.

[Masking Layer]

In the first and second inventions, the masking layer is a layer that is provided as necessary for the purpose of suppressing a change or variation in color of the base material layer 1. In this case, the masking layer is provided between the base material layer 1 and the surface layer 2, or between the base material layer 1 and the primer layer 2 when the primer layer 4 is provided, or between the base material layer 1 and the pattern layer 5 when the pattern layer 5 is provided.

The masking layer is provided for inhibiting the base material layer from adversely affecting the color tone and picture of the decorative sheet, and is therefore formed as a layer of opaque color in general.

The masking layer is formed using an ink composition obtained by appropriately mixing a binder with a colorant such as a pigment or a dye, an extender, a solvent, a stabilizer, a plasticizer, a catalyst, and a curing agent. The ink composition for forming the masking layer is appropriately selected from those to be used in the pattern layer.

The masking layer is desirable to be formed as a so called solid printing layer with its thickness usually set to about 1 to 20 μm.

The masking layer is formed by a normal printing method such as gravure printing, offset printing, silk screen printing, printing by transfer from a transfer sheet or inkjet printing; or a normal coating method such as gravure coating, gravure reverse coating, gravure offset coating, spinner coating, roll coating or reverse roll coating.

[Transparent Resin Layer 6]

In the first and second inventions, the transparent resin layer 6 is a layer that is provided as necessary for the purpose of improving chemical resistance and scratch resistance. In this case, the transparent resin layer 6 is provided between the base material layer 1 and the surface layer 2, or between the base material layer 1 and the primer layer 4 when the primer layer 4 is provided, or between the pattern layer 5 and the surface layer 2 when the pattern layer 5 is provided, or between the primer layer 4 and the pattern layer 5 when the primer layer 4 and the pattern layer 5 is provided in this order on the base material layer 1. The transparent resin layer 6 is a layer that is suitably provided in a decorative sheet which is integrated with a molded resin by an insert molding method.

The resin component for forming the transparent resin layer 6 is appropriately selected according to transparency, three-dimensional moldability, shape stability, chemical resistance and so on, and a thermoplastic resin is normally used. The thermoplastic resin is not particularly limited, and for example, acrylic resins, polyolefin resins such as polypropylene and polyethylene, polycarbonate resins, ABS resins, polyester resins such as polyethylene terephthalate (PET) and polyethylene naphthalate (PEN), vinyl chloride resins, and the like are used. Among these thermoplastic resins, acrylic resins, polyolefin resins, polycarbonate resins and polyester resins are preferred, acrylic resins and polyester resins are more preferred, and polyester resins are still more preferred from the viewpoint of chemical resistance, scratch resistance and the like.

One or both of the surfaces of the transparent resin layer 6 may be physically or chemically treated by an oxidation method, a roughening method or the like as necessary for improving adhesion with a layer that is in contact with the transparent resin layer 6. The physical or chemical surface treatment is the same as the surface treatment applied to the base material layer.

The thickness of the transparent resin layer 6 is not particularly limited, but for example, it is 10 to 200 μm, preferably 15 to 150 μm.

The transparent resin layer 6 may be laminated to other layer with an adhesive interposed therebetween, or may be laminated directly to other layer without interposing an adhesive therebetween. When the transparent resin layer 6 is laminated to other layer with an adhesive interposed therebetween, examples of the adhesive to be used include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubber, silicon-based resins. When the transparent resin layer 6 is laminated to other layer without interposing an adhesive therebetween, a method such as an extrusion method, a sand lamination method or a thermal lamination method can be used.

[Resin Layer 7]

In the first invention, the resin layer 7 is a layer that is provided immediately below the surface layer 2 (on a side opposite to the thermoplastic resin film layer 30) as necessary for the purpose of, for example, improving scratch resistance, weather resistance and the like of a decorative resin molded article. The resin layer 7 is suitably provided when the irregular shape of the surface layer 2 is formed by partially provided projections, and recesses in which a layer below the surface layer 2 is exposed between the projections.

The resin for forming the resin layer 7 in the first invention is not particularly limited, and examples thereof include curable resins and thermoplastic resins. Examples of the curable resin include thermosetting resins and ionizing radiation curable resins, and ionizing radiation curable resins are preferred. Specific examples of the thermosetting resin and the ionizing radiation curable resin may be the same as those shown as an example in [Surface Layer 2] above. Examples of the thermoplastic resin may be the same as those shown as an example in [Thermoplastic Resin Film Layer 30] above. When the resin layer 7 is composed of a thermoplastic resin, a thermoplastic resin film can be suitably used as the resin layer 7.

When the resin layer 7 is provided, an adhesive agent layer (not illustrated) may be provided immediately below the resin layer 7 (on a side opposite to the surface layer 2) as necessary for the purpose of, for example, improving adhesion between the resin layer 7 and a layer situated thereunder. Particularly, when a thermoplastic resin film is used as the resin layer 7, it is preferred to provide an adhesive agent layer. Examples of the resin for forming the adhesive agent layer may be the same as those shown as an example in [Back Adhesive Layer] below.

The thickness of the resin layer 7 is not particularly limited, but for example, it is 30 to 300 µm, preferably 50 to 200 µm.

[Back Adhesive Layer]

In the first and second inventions, the back adhesive layer (not illustrated) is a layer that is provided as necessary on the back surface of the base material layer 1 (surface on a side opposite to the surface layer 2) for the purpose of improving adhesion with a molded resin in molding of a decorative resin molded article.

For the back adhesive layer, a thermoplastic resin or a curable resin is used according to a molded resin to be used in the decorative resin molded article.

Examples of the thermoplastic resin to be used for formation of the back adhesive layer include acrylic resins, acryl-modified polyolefin resins, chlorinated polyolefin resins, vinyl chloride-vinyl acetate copolymers, thermoplastic urethane resins, thermoplastic polyester resins, polyamide resins and rubber-based resins. These thermoplastic resins may be used alone, or may be used in combination of two or more thereof.

Examples of the thermosetting resin to be used for formation of the back adhesive layer include urethane resins and epoxy resins. These thermosetting resins may be used alone, or may be used in combination of two or more thereof.

Method for Producing Decorative Sheet

The decorative sheet of the first invention can be produced through, for example, the following steps 1A and 2A.

Step 1A: forming a chromium oxidation treatment in which a surface layer having an irregular shape and formed of a cured product of a curable resin composition is laminated on a base material layer.

Step 2A: forming a releasable thermoplastic resin film layer on the surface layer of the laminated body obtained in the step 1A.

In the first step and the second step in the first invention, the components to be used for formation of the layers, the specific conditions for the method for forming each layer, the method for forming the irregular shape of the surface layer 2, and so on are as described in the section for the compositions of layers.

When the above-mentioned other layers (adhesive layer 31, release layer 32 and so on) are not laminated on the surface layer 2, the step 2A can be carried out through, for example, the step of:

forming a releasable thermoplastic resin film layer on the surface layer 2 by performing extrusion molding or heat lamination so as to fill recesses in the irregular shape of the surface layer 2.

When the adhesive layer 31 formed of an adhesive, and the thermoplastic resin film layer 30 are laminated on the surface layer 2, the step 2A can be carried out through, for example, the steps of:

forming the adhesive layer 31 on the surface layer 2 so as to fill recesses in the irregular shape of the surface layer 2 by applying a resin composition for forming the adhesive; and laminating the releasable thermoplastic resin film layer 30 on the adhesive layer 31.

When the release layer 32 and the thermoplastic resin film layer 30 are laminated on the surface layer 2, the step 2A can be carried out through, for example, the steps of:

forming the release layer 32 on the surface layer 2 so as to fill recesses in the irregular shape of the surface layer 2 by applying a resin composition for forming the release layer 32; and laminating the releasable thermoplastic resin film layer 30 on the release layer 32.

When a laminated body of the release layer 32, the adhesive layer 31 and the thermoplastic resin film layer 30 is formed on the surface layer 2, the step 2A can be carried out through, for example, the steps of:

forming the release layer 32 on the surface layer 2 so as to fill recesses in the irregular shape of the surface layer 2 by applying a resin composition for forming the release layer 32; and forming the adhesive layer 31 on the release layer 32 so as to fill recesses in the irregular shape of the surface layer 2 by applying a resin composition for forming the adhesive; and laminating the thermoplastic resin film layer 30 on the adhesive layer 31.

The decorative sheet of the second invention can be produced through, for example, the following steps 1B to 3B.

Step 1B: providing the surface layer 2 having an irregular shape.

Step 2B: laminating the adhesive layer 31 on the surface layer 2 by applying an adhesive so as to fill recesses in the irregular shape of the surface layer 2.

Step 3B: laminating the release film layer 33 on the adhesive layer 31.

In the steps 1B to 3B, the components to be used for formation of the layers, the specific conditions for the method for forming each layer, the method for forming the irregular shape of the surface layer 2, and so on are as described in the section for the compositions of layers.

When the irregularity protective layer 3 is formed from a laminated body of release layer 32, the adhesive layer 31 and the release film layer 33, the steps 2B and 3B can be carried out through, for example, the steps of:

forming the release layer 32 on the surface layer 2 so as to fill recesses in the irregular shape of the surface layer 2 by applying a resin composition for forming the release layer 32;

forming the adhesive layer 31 on the release layer 32 so as to fill recesses in the irregular shape of the surface layer 2 by applying an adhesive; and laminating the release film layer 33 on the adhesive layer 31.

When the surface layer 2 is formed from a resin film, the step 1B can be carried out through, for example, the steps of:

providing the surface layer 2 composed of a resin film; and performing embossing from above the surface layer 2 to form an irregular shape on a surface of the surface layer 2.

Here, when other layers such as the pattern layer 5 and the primer layer 4 are formed between the base material layer 1 and the surface layer 2, this can be carried out through the steps of:

laminating other layers such as the pattern layer 5 or the primer layer 4 on the base material layer 1; laminating the surface layer 2 composed of a resin film on the other layer such as pattern layer 5 or primer layer 4; and performing embossing from above the surface layer 2 to form an irregular shape on a surface of the surface layer 2.

2. Decorative Resin Molded Article with Thermoplastic Resin Film Layer

Figure 8:
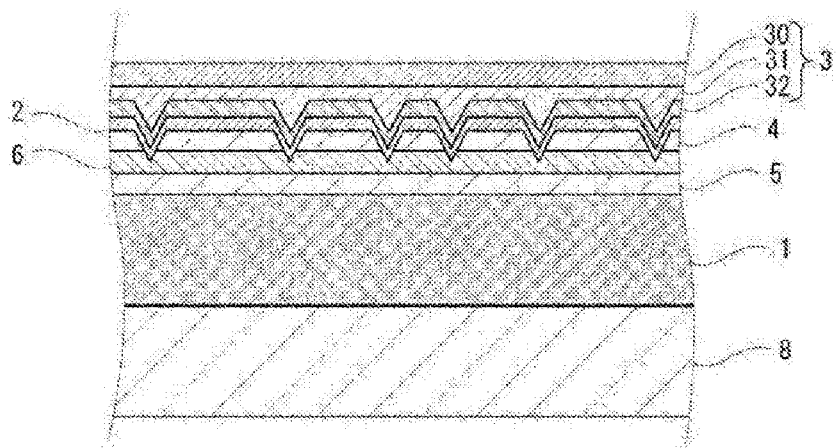
FIG. 8 is a schematic view of a cross section structure of one form of a decorative resin molded article with a thermoplastic resin film layer according to the first invention.
Figure 9:
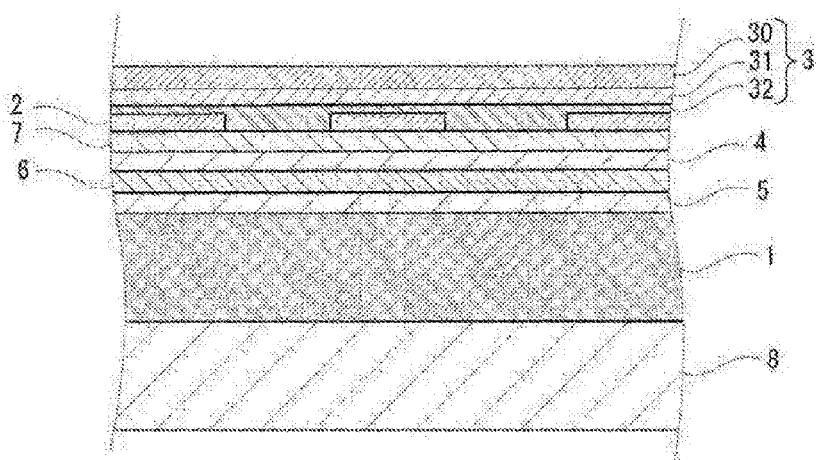
FIG. 9 is a schematic view of a cross section structure of one form of a decorative resin molded article with a thermoplastic resin film layer according to the first invention.

The decorative resin molded articles with a thermoplastic resin film layer according to the first and second inventions are formed by integrating a molded resin with the decorative sheets of the first and second inventions, respectively. That is, the decorative resin molded article with a thermoplastic resin film layer according to the first invention is characterized in that at least the molded resin layer 8, the base material layer 1, the surface layer 2 having an irregular shape, and the thermoplastic resin film layer 30 are laminated in this order, and the surface layer 2 is formed of a cured product of a curable resin composition. FIGS. 7 and 8 each show a cross section structure of one aspect of the decorative resin molded article with a thermoplastic resin film layer according to the first invention.

Figure 15:
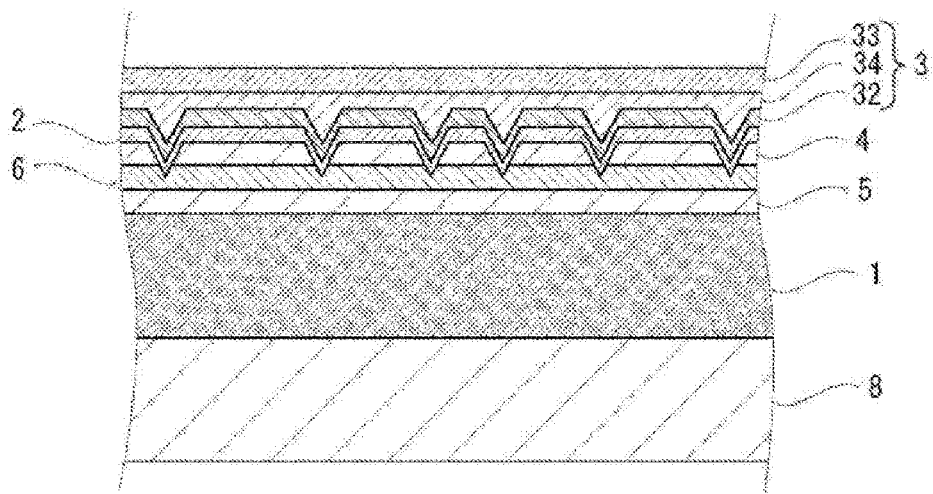
FIG. 15 is a schematic view of a cross section structure of one form of a decorative resin molded article with an irregularity protective layer according to the second invention.

The decorative resin molded article with an irregularity protective layer according to the second invention is characterized in that at least the molded resin layer 7, the surface layer 2 having an irregular shape, and the releasable irregularity protective layer 3 are laminated in this order, and the irregularity protective layer 3 includes the adhesive layer 31 filling recesses in the irregular shape of the surface layer 2, and the release film layer 33 in this order from the surface layer 2 side. FIG. 15 shows a cross section structure of one aspect of the decorative resin molded article with an irregularity protective layer according to the second invention.

The decorative resin molded article with a thermoplastic resin film layer according to the present invention (first and second inventions) can be produced by a method including the step of forming a molded resin layer on the base material layer of the decorative sheet of the present invention by injecting a resin. Specifically, the decorative resin molded article is prepared by various injection molding methods such as an insert molding method, an injection molding simultaneous decorating method, a blow molding method and a gas injection molding method using the decorative sheet of the present invention. The decorative sheet of the present invention is subjected to various kinds of injection molding methods to prepare a decorative resin molded article with a thermoplastic resin film layer, and thus the effect of suppressing deterioration of the irregular shape during injection molding can be exhibited. Therefore, one preferred example of the molded resin layer 8 that forms the decorative resin molded article with a thermoplastic resin film layer according to the present invention is an injected resin layer formed by injection molding. Among these injection molding methods, an insert molding method and injection molding simultaneous decorating method are preferable.

In the insert molding method, first the decorative sheet of the present invention is vacuum-molded into a molded article surface shape beforehand using a vacuum molding die (off-line pre-molding) in a vacuum molding step, and then an unnecessary portion is trimmed off as necessary to obtain a molded sheet. The molded sheet is inserted into an injection molding die, the injection molding die is closed, a fluidized resin is injected into the die, and solidified to integrate the base material layer 1 of the decorative sheet with the outer surface of the resin molded body in parallel with injection molding, thereby producing a decorative resin molded article with a thermoplastic resin film layer.

More specifically, the decorative resin molded article with a thermoplastic resin film layer according to the present invention is produced by an insert molding method including:

a vacuum molding step of molding the decorative sheet of the present invention into a three-dimensional shape beforehand by a vacuum molding die;

a step of trimming off an unnecessary portion of the vacuum-molded decorative sheet to obtain a molded sheet; and a step of inserting the molded sheet obtained in the preceding step into an injection molding die, closing the injection molding die, and injecting a fluidized resin into the die to integrate the resin with the molded sheet.

In the vacuum molding step in the insert molding method, the decorative sheet may be heated and molded.

The heating temperature here is not particularly limited, and may be appropriately selected according to a type of the resin that forms the decorative sheet, or a thickness of the decorative sheet, but for example, when an ABS resin film is used as the base material layer, the heating temperature may be normally about 100 to 250° C., preferably about 130 to 200° C. In the integration step, the temperature of the fluidized resin is not particularly limited, but it may be normally about 180 to 320° C., preferably 220 to 280° C.

In the injection molding simultaneous decorating method, the decorative sheet of the present invention is disposed in a female die also serving as a vacuum molding die provided with a suction hole for injection molding, and is subjected to pre-molding in this female die (in-line pre-molding), the injection molding die is then closed, a fluidized resin is injected and filled into the die, and solidified to integrate the base material layer 1 of the decorative sheet of the present invention with the outer surface of the resin molded body in parallel to injection molding, thereby producing a decorative resin molded article with a thermoplastic resin film layer.

More specifically, the decorative resin molded article with a thermoplastic resin film layer according to the present invention is produced by an injection molding simultaneous decorating method including:

a step of placing the decorative sheet of the present invention in such a manner that the base material of the decorative sheet faces a molding surface of a movable die, the molding surface having a predetermined shape, then heating and softening the decorative sheet, and vacuum-suctioning the decorative sheet from the movable die side to adhere the softened decorative sheet along the molding surface of the movable die, thereby preliminarily molding the decorative sheet;

an injection molding step of closing the movable die having the decorative sheet adhered along the molding surface, and a fixed die, then injecting and filling a fluidized resin molded material into a cavity formed by both the dies, solidifying the resin, and laminating and integrating the formed resin molded body and the decorative sheet with each other; and a step of separating the movable die from the fixed die to take out the resin molded body with all the layers of the decorative sheet laminated thereon.

In the pre-molding step in the injection molding simultaneous decorating method, the heating temperature of the decorative sheet is not particularly limited, and may be appropriately selected according to a type of the resin that forms the decorative sheet, or a thickness of the decorative sheet, but when a polyester resin film or an acrylic resin film is used as the base material layer, the heating temperature may be normally about 70 to 130° C. In the injection molding step, the temperature of the fluidized resin is not particularly limited, but it may be normally about 180 to 320° C., preferably about 220 to 280° C.

The decorative resin molded article of the present invention can also be prepared by a decoration method in which the decorative sheet of the present invention is bonded onto a previously provided three-dimensional resin molded body (molded resin layer), such as a vacuum press-bonding method.

In the vacuum press-bonding method, first the decorative sheet of the present invention and a resin molded body are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and that the base material layer 1 side of the decorative sheet faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is pressed against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off as necessary, so that the decorative resin molded article of the present invention can be obtained.

Preferably, the vacuum press-bonding method includes a step of heating the decorative sheet for softening the decorative sheet to improve the moldability thereof before the step of pressing the molded body against the decorative sheet. The vacuum press-bonding method including such a step may be referred to particularly as a vacuum heating and press-bonding method. The heating temperature in such a step may be appropriately selected according to a type of the resin that forms the decorative sheet, or a thickness of the decorative sheet, but when a polyester resin film or an acrylic resin film is used as the base material layer, the heating temperature may be normally about 60 to 200° C.

In the decorative resin molded article with a thermoplastic resin film layer according to the present invention, a molded resin appropriate to a use may be selected to form the molded resin layer. The molded resin may be either a thermoplastic resin or a thermosetting resin.

Specific examples of the thermoplastic resin to be used as a molded resin include polyolefin-based resins such as polyethylene and polypropylene, ABS resins, styrene resins, polycarbonate resins, acrylic resins and vinyl chloride resins. These thermoplastic resins may be used alone, or may be used in combination of two or more thereof.

Examples of the thermosetting resin to be used as a molded resin include urethane resins and epoxy resins. These thermosetting resins may be used alone, or may be used in combination of two or more thereof.

A decorative resin molded article can be obtained by separating and removing a thermoplastic resin film layer from the decorative resin molded article with a thermoplastic resin film layer according to the present invention. Since in the decorative resin molded article with a thermoplastic resin film layer, the thermoplastic resin film layer serves as a protective sheet for the decorative resin molded article, the thermoplastic resin film layer may be maintained as it is without being separated after production of the decorative resin molded article with a thermoplastic resin film layer, and may be separated at the time of use. When used in this manner, the decorative resin molded article can be prevented from being scratched by, for example, scraping during transportation.

3. Decorative Resin Molded Article

Figure 10:
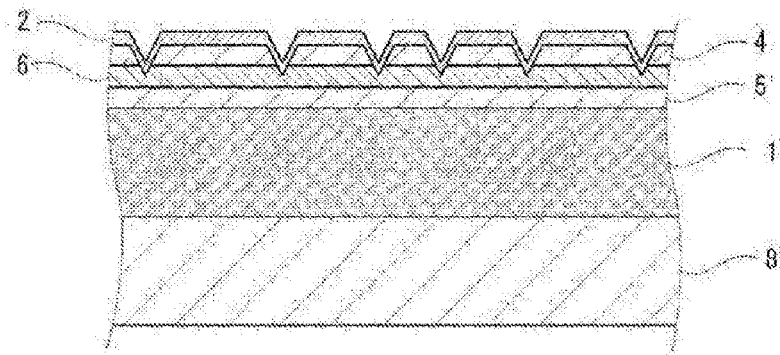
FIG. 10 is a schematic view of a cross section structure of one form of a decorative resin molded article of the first invention.
Figure 11:
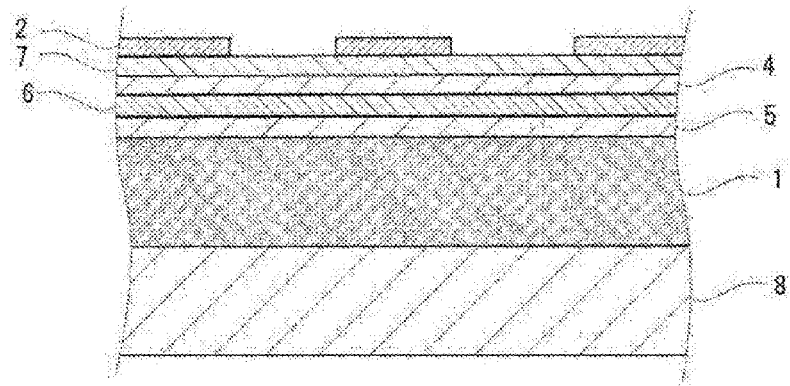
FIG. 11 is a schematic view of a cross section structure of one form of a decorative resin molded article of the first invention.

In the first invention, a decorative resin molded article with an irregular shape formed on a surface thereof can be obtained by separating and removing a thermoplastic resin film layer 30 from the decorative resin molded article with the thermoplastic resin film layer. When other layers such as the adhesive layer 31 and the release layer 32 are laminated between the thermoplastic resin film layer 30 and the surface layer 2, the other layers are separated and removed in parallel with the thermoplastic resin film layer 30. When a thermoplastic resin film layer 30 is separated and removed from the decorative resin molded article with the thermoplastic resin film layer, the surface layer 2 appears on a surface of the decorative resin molded article, and a further excellent design feeling and touch feeling are exhibited from the irregular shape. FIGS. 10 and 11 each show a cross section structure of one aspect of each of decorative resin molded articles obtained by removing the thermoplastic resin film layer 30 from the decorative resin molded articles with the thermoplastic resin film layer in FIGS. 7 and 8, respectively.

Figure 16:
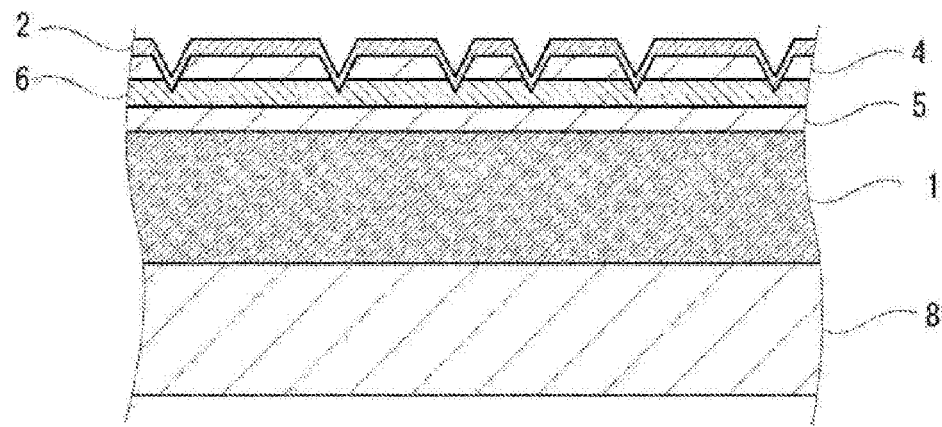
FIG. 16 is a schematic view of a cross section structure of one form of a decorative resin molded article of the second invention.

In the second invention, a decorative resin molded article with an irregular shape formed on a surface thereof can be obtained by separating and removing a irregularity protective layer 3 from the decorative resin molded article with the irregularity protective layer. When the support is separated and removed from the decorative resin molded article with an irregularity protective layer, the surface layer 2 appears on a surface of the decorative resin molded article, and a further excellent design feeling and touch feeling are exhibited from the irregular shape. In the second invention, FIG. 16 shows a cross section structure of one aspect of a decorative resin molded article from which the irregularity protective layer 3 is removed.

The decorative resin molded articles of the first and second inventions each have an excellent design feeling and touch feeling from an irregular shape. Therefore, the decorative resin molded articles can be used for, for example, interior materials or exterior materials of vehicles such as automobiles; fixture members such as baseboards and cornices; fittings such as window frames and door frames; interior materials of buildings such as walls, floors and ceilings; housings of household electric appliances such as television receivers and air conditioners; and containers etc.

EXAMPLES

Hereinafter, the present invention will be described in detail by way of examples and comparative examples. However, the present invention is not limited to examples.

[Production of Decorative Sheet]

Example 1A

An ABS resin film (thickness: 200 μm) was used as a base material layer. A pattern layer (thickness: 5 μm) with a wood-grain pattern was formed on the base material layer by gravure printing using an ink composition containing an acrylic resin. A resin composition for a primer layer, which contained a binder resin composed of a two-liquid curable resin containing 100 parts by mass of a main agent (acryl polyol/urethane, mass ratio: 9/1) and 7 parts by mass of a curing agent (hexamethylene diisocyanate), was applied onto the pattern layer, and dried to form a 2 μm-thick primer layer, thereby obtaining a laminated body in which a base material layer, a pattern layer and a primer layer were laminated in this order.

The primer layer side of the laminated body obtained as described above was embossed to form an irregular shape of dot picture on the primer layer. The embossing plate depth (height between the recess bottom and the projection top surface) of an embossing plate used in the embossing was 60 μm. Next, onto the primer layer provided with an irregular shape, an ionizing radiation curable resin composition (EB1) as described later was applied so as to have a thickness of 8 μm after curing. The resin composition was irradiated with an electron beam having an accelerating voltage of 165 kV and an amount of radiation of 50 kGy (5 Mrad), so that the resin composition was cured to form a surface layer having an irregular shape.

Next, a polyethylene layer was formed on the surface layer by extrusion molding to obtain a decorative sheet having a laminated structure in which a base material layer, a pattern layer, a primer layer, a surface layer having an irregular shape, and a thermoplastic resin film layer (polyethylene film) were laminated in this order. As conditions for extrusion molding, the under-die temperature of an extruder was 230 to 250° C., and the thickness of the polyethylene layer was 50 μm.

Example 2A

In the same manner as in Example 1A, a surface layer having an irregular shape was formed on a laminated body in which a base material layer, a pattern layer and a primer layer were laminated in this order. Next, except that a polyethylene film (thickness: 30 μm) as a thermoplastic resin film layer was laminated on the surface layer, and the surface layer and the thermoplastic resin film layer were bonded to each other by a heat lamination method, the same procedure as in Example 1A was carried out to obtain a decorative sheet having a laminated structure in which a base material layer, a pattern layer, a primer layer, a surface layer having an irregular shape, and a thermoplastic resin film layer were laminated in this order. As conditions for the heat lamination method, the heating temperature of was 200 to 230° C., the pressure was 5 kgf, and the thickness of the polyethylene layer was 50 μm.

Example 3A

Except that as an ionizing radiation curable resin composition for forming the surface layer, EB2 as described later was used in place of EB1, the same procedure as in Example 1A was carried out to obtain a decorative sheet having a laminated structure in which a base material layer, a pattern layer, a primer layer, a surface layer having an irregular shape, and a thermoplastic resin film layer were laminated in this order.

Example 4A

Except that as an ionizing radiation curable resin composition for forming the surface layer, EB2 was used in place of EB1, the same procedure as in Example 1A was carried out to form a surface layer having an irregular shape on a laminated body in which a base material layer, a pattern layer and a primer layer were laminated in this order. Next, an ionizing radiation curable resin composition (EB3) as described later was applied onto the surface layer so as to have a thickness of 10 μm after curing. The resin composition was irradiated with an electron beam having an accelerating voltage of 165 kV and an amount of radiation of 50 kGy (5 Mrad), so that the resin composition was cured to form a release layer on the surface layer. Next, an adhesive composed of a polyester resin composition was applied onto the release layer so as to have a thickness of 30 μm after curing, thereby forming an adhesive layer so as to fill recesses in the irregular shape of the surface layer. Next, a thermoplastic resin film layer (polyethylene film, thickness: 30 μm) was laminated on the adhesive layer to obtain a decorative sheet having a laminated structure in which a base material layer, a pattern layer, a primer layer, a surface layer having an irregular shape, a release layer, an adhesive layer and a thermoplastic resin film layer were laminated in this order.

Comparative Example 1A

An acrylic resin film (thickness: 75 μm) was used as a surface layer. A pattern layer (thickness: 5 μm) with a wood-grain pattern was formed on the surface layer by gravure printing using an ink composition containing an acrylic resin. An ABS resin film (thickness: 200 μm) as a base material layer was laminated on the pattern layer. A surface of the obtained laminated body on the surface layer side was then embossed using the same embossing plate as in Example 1A, thereby forming an irregular shape of dot picture on the surface layer. Next, in the same manner as in Example 1A, a thermoplastic resin film layer (polyethylene layer) was formed on the surface layer having an irregular shape by extrusion molding to obtain a decorative sheet having a laminated structure in which a base material layer, a pattern layer, a surface layer having an irregular shape, and a thermoplastic resin film layer were laminated in this order.

Example 5A

An ABS resin film (thickness: 400 μm) was used as a base material layer. A pattern layer (thickness: 5 μm) with a wood-grain pattern was formed on the base material layer by gravure printing using an ink composition containing an acrylic resin. A resin composition for a primer layer, which contained a binder resin composed of a two-liquid curable resin containing 100 parts by mass of a main agent (acryl polyol/urethane, mass ratio: 9/1) and 7 parts by mass of a curing agent (hexamethylene diisocyanate), was applied onto the pattern layer, and dried to form a 2 μm-thick primer layer, thereby obtaining a laminated body in which a base material layer, a pattern layer and a primer layer were laminated in this order. Next, an ionizing radiation curable resin composition (UV) as described later was printed by screen printing so as to have a coating thickness of 30 μm in the form of dots having a diameter of 2 mm. The uncured resin layer was irradiated with an ultraviolet ray with an integrated light amount of 600 mJ/cm$^2$, so that the ionizing radiation curable resin was cured to form a surface layer having an irregular shape. Next, a polyethylene layer was formed on the surface layer by extrusion molding to obtain a decorative sheet having a laminated structure in which a base material layer, a pattern layer, a primer layer, a surface layer having an irregular shape, and a thermoplastic resin film layer (polyethylene film) were laminated in this order. As conditions for extrusion molding, the under-die temperature of an extruder was 230 to 250° C., and the thickness of the polyethylene layer was 50 μm.

Example 6A

The same procedure as in Example 5A was carried out to obtain a laminated body in which a base material layer, a pattern layer and a primer layer were laminated in this order. Next, an ionizing radiation curable resin composition (EB3) as described later was applied onto the primer layer by bar coating so as to have a thickness of 10 μm after curing. The uncured resin layer was irradiated with an electron beam having an accelerating voltage of 165 kV and an amount of radiation of 50 kGy (5 Mrad), so that a resin layer was provided. Next, in the same manner as in Example 5A, a surface layer having an irregular shape, and a thermoplastic resin film layer were formed on the resin layer to obtain a decorative sheet having a laminated structure in which a base material layer, a pattern layer, a primer layer, a resin layer, a surface layer having an irregular shape, and a thermoplastic resin film layer (polyethylene film) were laminated in this order.

Example 7A

A 75 μm-thick colorless and transparent acrylic resin sheet mainly composed of polymethyl methacrylate was provided as a resin layer, an adhesive agent layer (thickness: 10 μm) composed of polymethyl methacrylate and a two-liquid curable urethane resin-based adhesive, and a pattern layer (thickness: 5 μm) with a wood-grain pattern were laminated in this order on the back surface of the resin layer, and a base material layer (thickness: 400 μm) composed of an ABS resin was then laminated on the pattern layer by dry lamination to obtain a laminated body in which a base material layer, a pattern layer, an adhesive agent layer and a resin layer were laminated in this order. Next, in the same manner as in Example 5A, a surface layer having an irregular shape, and a thermoplastic resin film layer were formed to obtain a decorative sheet having a laminated structure in which a base material layer, a pattern layer, an adhesive agent layer, a resin layer, a surface layer having an irregular shape, and a thermoplastic resin film layer (polyethylene film) were laminated in this order.

Example 8A

The same procedure as in Example 5A was carried out to obtain a laminated body in which a base material layer, a pattern layer, a primer layer and a surface layer having an irregular shape were laminated in this order. Next, an A-PET film was laminated on the surface layer by extrusion molding to obtain a decorative sheet having a laminated structure in which a base material layer, a pattern layer, a primer layer, a surface layer having an irregular shape, and a thermoplastic resin film layer (A-PET) were laminated in this order. As conditions for extrusion molding, the under-die temperature of an extruder was 250 to 260° C., and the thickness of the PET layer was 50 μm.

Comparative Example 2A

Except that a thermoplastic resin film layer was not formed, the same procedure as in Example 5A was carried out to obtain a decorative sheet having a laminated structure in which a base material layer, a pattern layer, a primer layer, and a surface layer having an irregular shape were laminated in this order.

Comparative Example 3A

Except that a thermoplastic resin film layer was not formed, the same procedure as in Example 6A was carried out to obtain a decorative sheet having a laminated structure in which a base material layer, a pattern layer, a primer layer, a resin layer and a surface layer having an irregular shape were laminated in this order.

Comparative Example 4A

Except that a thermoplastic resin film layer was not formed, the same procedure as in Example 7A was carried out to obtain a decorative sheet having a laminated structure in which a base material layer, a pattern layer, an adhesive agent layer, a resin layer, and a surface layer having an irregular shape were laminated in this order.

[Production of Decorative Resin Molded Article]

Each decorative sheet was heated to 160° C. with an infrared heater, and thereby softened. The decorative sheet was then vacuum-molded using a vacuum molding die (maximum draw ratio: 100%), and pre-molded so as to follow the inner shape of a die to close the die. Thereafter, a mixed resin of polycarbonate and ABS was injected into the cavity of the die to integrally mold the decorative sheet and the molded resin, thereby obtaining a decorative resin molded article with a thermoplastic resin film layer. The thermoplastic resin film layer was then manually separated from the obtained decorative resin molded article with a thermoplastic resin film layer to obtain a decorative resin molded article. The decorative sheet in each of Examples 1A to 8A and Comparative Example 1A was excellent in three-dimensional moldability because a thermoplastic resin film layer was used as a layer for protecting the irregular shape of the surface layer.

<Evaluation of Irregular Shape of Decorative Sheet>

The irregularity impression was evaluated visually and tactilely for a change in irregular shape of the surface layer before and after formation of the thermoplastic resin film layer in the process for producing the decorative sheet in each of examples and comparative examples. Separation of the thermoplastic resin film layer from the decorative sheet was performed by manually separating the thermoplastic resin film layer from the decorative sheet. The evaluation criteria are as follows. The results are shown in Tables 1A and 2A.

◯: There is little change in irregularity impression.

Δ: There is a change in irregularity impression, but an irregularity impression is exhibited even when the thermoplastic resin film layer is separated after being formed.

x: There is a considerable change in irregularity impression, and an irregularity impression is not exhibited after the thermoplastic resin film layer is separated.

<Evaluation of Irregular shape of Decorative Resin Molded Article>

The irregularity impression was evaluated visually and tactilely for a change in irregular shape before and after production of the decorative resin molded article from each decorative sheet. The evaluation criteria are as follows. The results are shown in Tables 1A and 2A.

○: There is little change in irregularity impression after production of the decorative resin molded article, and a high irregularity impression is exhibited.

Δ: There is a change in irregularity impression after production of the decorative resin molded article, but an irregularity impression is exhibited in the decorative resin molded article.

x: There is a considerable change in irregularity impression after production of the decorative resin molded article, and an irregularity impression is not exhibited in the decorative resin molded article.

EB1

Difunctional polycarbonate acrylate (weight average molecular weight: 10,000): 95 parts by mass Tetrafunctional urethane acrylate oligomer (weight average molecular weight: 6,000): 5 parts by mass

EB2

Difunctional polycarbonate acrylate (weight average molecular weight: 8,000): 95 parts by mass Difunctional silicone acrylate oligomer (weight average molecular weight: 6,000): 5 parts by mass

EB3

Trifunctional pentaerythritol acrylate (weight average molecular weight: 300): 30 parts by mass Acryl polymer (weight average molecular weight: 120,000): 70 parts by mass

UV

Urethane-based acrylate oligomer (weight average molecular weight: about 8000): 20 parts by mass Filler and pigment: 10 parts by mass

TABLE 1A

|  | Example 1A | Example 2A | Example 3A | Example 4A | Comparative Example 1A |
|---|---|---|---|---|---|
| Surface layer | EB1 | EB1 | EB2 | EB2 | Acrylic resin film |
| Configuration of irregularity protective layer (in order from the surface layer side) | Thermoplastic resin film layer | Thermoplastic resin film layer | Thermoplastic resin film layer | EB3 (release layer)/adhesive layer/thermoplastic resin film layer | Thermoplastic resin film layer |
| Bonding of surface layer and thermoplastic resin film layer | Extrusion molding of polyethylene | Heat lamination of polyethylene film | Extrusion molding of polyethylene | Adhesive containing polyester resin composition | Extrusion molding of polyethylene |
| Evaluation of irregular shape of decorative sheet | Δ | Δ | Δ | ○ | x |
| Evaluation of irregular shape of decorative resin molded article | Δ | Δ | Δ | ○ | x |

TABLE 2A

|  | Example 5A | Example 6A | Example 7A | Example 8A | Comparative Example 2A | Comparative Example 3A | Comparative Example 4A |
|---|---|---|---|---|---|---|---|
| Surface layer | UV | UV | UV | UV | UV | UV | UV |
| Layer below surface layer | Primer layer | EB3 | Resin layer (Acrylic resin film) | Primer layer | Primer layer | EB3 | Resin layer (Acrylic resin film) |
| Configuration of irregularity protective layer | Thermoplastic resin film layer | Thermoplastic resin film layer | Thermoplastic resin film layer | Thermoplastic resin film layer | — | — | — |
| Bonding of surface layer and thermoplastic resin film layer | Extrusion molding of polyethylene | Extrusion molding of polyethylene | Extrusion molding of polyethylene | Extrusion molding of A-PET | — | — | — |
| Evaluation of irregular shape of decorative sheet | ○ | ○ | ○ | ○ | — | — | — |
| Evaluation of irregular shape of decorative resin molded article | ○ | ○ | ○ | ○ | x | x | x |

Difunctional acrylate monomer: 60 parts by mass
Photosensitive compound: 5 parts by mass
Photopolymerization initiator: 5 parts by mass
   Polyester Resin Composition in Adhesive Layer
polyester polyol: isocyanate=100:10
Extrusion-molded polyethylene
Extrusion grade low-density PE
   Heat-Laminated Polyethylene Film
low-density PE film In Example 7A, a thermoplastic resin film was extrusion-molded directly on a partially exposed resin layer composed of an acrylic resin film (thermoplastic resin), and an excellent result was obtained in evaluation of the irregular shape of the decorative resin molded article. From this result, it is considered that the irregularity impression of the decorative resin molded article depends on the shape of a surface layer (convex area layer) composed of a curable resin, and even when the acrylic resin film is somewhat deformed in extrusion molding, the irregularity impression is not deteriorated as long as the surface layer is not deformed.

Example 9A

Except that in place of polyethylene, A-PET was extrusion-molded on the surface layer, the same procedure as in Example 1A was carried out to obtain a decorative sheet having a laminated structure in which a base material layer, a pattern layer, a primer layer, a surface layer having an irregular shape, and a thermoplastic resin film layer (A-PET film) were laminated in this order. Using the obtained decorative sheet, a decorative resin molded article was produced in the same manner as in other examples. Resultantly, good three-dimensional moldability was exhibited, and both the decorative sheet and the decorative resin molded article had an irregularity impression on the surface. In Example 1A, a slight gate flow occurred at some parts, but in Example 9A, a gate flow did not occur. In Example 1A, residues of the thermoplastic resin film existed in the suction hole of the female die after molding, but in Example 9A, such residues did not exist.

Example 10A

Except that as an ionizing radiation curable resin composition for forming the surface layer, EB2 was used in place of EB1 (the ionizing radiation curable resin composition was applied so as to have a thickness of 30 μm after curing), the same procedure as in Example 1A was carried out to obtain a decorative sheet having a laminated structure in which a base material layer, a pattern layer, a primer layer, a surface layer having an irregular shape, and a thermoplastic resin film layer were laminated in this order. The irregular shape of each of the decorative sheet and the decorative resin molded article was evaluated in the same manner as in Examples 1A to 8A. The results are shown in Table 3A. In Examples 1A to 8A, cracks etc. were not generated on the surface layer even in vacuum molding of the decorative sheet in the evaluation, but in Example 10A, minor cracks were generated on the surface layer in molding because the surface layer had a slightly large thickness of 30 μm.

Example 11A

Except that as an ionizing radiation curable resin composition for forming the surface layer, EB2 was used in place of EB1 (the ionizing radiation curable resin composition was applied so as to have a thickness of 50 μm after curing), the same procedure as in Example 1A was carried out to obtain a decorative sheet having a laminated structure in which a base material layer, a pattern layer, a primer layer, a surface layer having an irregular shape, and a thermoplastic resin film layer were laminated in this order. The irregular shape of each of the decorative sheet and the decorative resin molded article was evaluated in the same manner as in Examples 1A to 8A. The results are shown in Table 3A. In Examples 1A to 8A, cracks etc. were not generated on the surface layer even in vacuum molding of the decorative sheet in the evaluation, but in Example 11A, cracks were generated on the surface layer in molding because the surface layer had a large thickness.

TABLE 3A

|  | Example 10A | Example 11A |
| --- | --- | --- |
| Surface layer | EB2 | EB2 |
| Configuration of irregularity protective layer | Thermoplastic resin film layer | Thermoplastic resin film layer |
| Bonding of surface layer and thermoplastic resin film layer | Extrusion molding of polyethylene | Extrusion molding of polyethylene |
| Evaluation of irregular shape of decorative sheet | Δ | Δ |
| Evaluation of irregular shape of decorative resin molded article | Δ | Δ |

[Production of Decorative Sheet]

Example 1B

An ABS resin film (thickness: 200 μm) was used as a base material layer. A pattern layer (thickness: 5 μm) with a wood-grain pattern was formed on the base material layer by gravure printing using an ink composition containing an acrylic resin. A resin composition for a primer layer, which contained a binder resin composed of a two-liquid curable resin containing 100 parts of a main agent (acryl polyol/urethane, mass ratio: 9/1) and 7 parts of a curing agent (hexamethylene diisocyanate), was applied onto the pattern layer, and dried to form a 2 μm-thick primer layer, thereby obtaining a laminated body in which a base material layer, a pattern layer and a primer layer were laminated in this order.

The primer layer of the laminated body obtained as described above was embossed to form an irregular shape of dot picture on the primer layer. The embossing plate depth (height between the recess bottom and the projection top surface) of an embossing plate used in the embossing was 60 μm. Next, onto the primer layer provided with an irregular shape, an ionizing radiation curable resin composition (EB1) as described later was applied so as to have a thickness of 8 μm after curing. The resin composition was irradiated with an electron beam having an accelerating voltage of 165 kV and an amount of radiation of 50 kGy (5 Mrad), so that the resin composition was cured to form a surface layer having an irregular shape.

Next, an adhesive composed of a polyester resin composition was applied onto the surface layer so as to have a thickness of 30 μm after curing, thereby forming an adhesive layer so as to fill recesses in the irregular shape of the surface layer. Next, a release film layer formed of polyethylene (thickness: 30 μm) was laminated on the adhesive layer to obtain a decorative sheet having a laminated structure in which a base material layer, a pattern layer, a primer layer, a surface layer having an irregular shape, and an irregularity protective layer (adhesive layer/release film layer) were laminated in this order.

Example 2B

An acrylic resin film (thickness: 75 µm) was used as a surface layer. A pattern layer (thickness: 5 µm) with a wood-grain pattern was formed on the surface layer by gravure printing using an ink composition containing an acrylic resin. An ABS resin film (thickness: 200 µm) as a base material layer was laminated on the pattern layer. Next, the surface layer side of the obtained laminated body was embossed to form an irregular shape of dot picture on the surface layer. The embossing plate used in embossing is identical to that in Example 1B. Thus, a laminated body was obtained in which a base material layer, a pattern layer and a surface layer having an irregular shape were laminated in this order. Next, in the same manner as in Example 1B, an adhesive layer and a release film were laminated on the surface layer to obtain a decorative sheet having a laminated structure in which a base material layer, a pattern layer, a surface layer having an irregular shape, and an irregularity protective layer (adhesive layer/release film layer) were laminated in this order.

Example 3B

The same procedure as in Example 1B was carried out to obtain a laminated body in which a base material layer, a pattern layer and a primer layer were laminated in this order, and a surface layer having an irregular shape was then formed using an ionizing radiation curable resin composition (EB2) as described later. An ionizing radiation curable resin composition (EB3) as described later was applied onto the surface layer so as to have a thickness of 10 µm after curing. The resin composition was irradiated with an electron beam having an accelerating voltage of 165 kV and an amount of radiation of 50 kGy (5 Mrad), so that the resin composition was cured to form a release layer on the surface layer.

Next, an adhesive composed of a polyester resin composition was applied onto the release layer so as to have a thickness of 30 µm after curing, thereby forming an adhesive layer so as to fill recesses in the irregular shape of the surface layer. Next, the release film layer was laminated on the adhesive layer from the adhesive layer side to obtain a decorative sheet having a laminated structure in which a base material layer, a pattern layer, a primer layer, a surface layer having an irregular shape, and an irregularity protective layer (release layer/adhesive layer/release film layer) were laminated in this order.

Comparative Example 1B

Except that a polyethylene layer was formed on the surface layer having an irregular shape by extrusion molding, the same procedure as in Example 2B was carried out to obtain a decorative sheet having a laminated structure in which a base material layer, a pattern layer, a surface layer having an irregular shape, and an irregularity protective layer (polyethylene layer) were laminated in this order. As conditions for extrusion molding, the under-die temperature of an extruder was 230 to 250° C., and the thickness of the polyethylene layer was 50 µm.

Comparative Example 2B

Except that a polyethylene film (thickness: 50 µm) was laminated on the surface layer having an irregular shape, and the surface layer and the release film layer were bonded to each other by a heat lamination method, the same procedure as in Example 1B was carried out to obtain a decorative sheet having a laminated structure in which a base material layer, a pattern layer, a primer layer, a surface layer having an irregular shape, and an irregularity protective layer (polyethylene film layer) were laminated in this order. As conditions for the heat lamination method, the heating temperature was 200 to 230° C., and the pressure was 5 kgf/cm$^2$.

[Production of Decorative Resin Molded Article]

Each decorative sheet was heated to 160° C. with an infrared heater, and thereby softened. The decorative sheet was then vacuum-molded using a vacuum molding die (maximum draw ratio: 100%), and pre-molded so as to follow the inner shape of a die to close the die. Thereafter, a mixed resin of polycarbonate and ABS was injected into the cavity of the die to integrally mold the decorative sheet and the molded resin, thereby obtaining a decorative resin molded article with an irregularity protective layer. The irregularity protective layer was then manually separated from the obtained decorative resin molded article with an irregularity protective layer to obtain a decorative resin molded article.

<Evaluation of Irregular Shape>

For evaluating the irregular shape of the surface of the decorative resin molded article, the center-line mean roughness (Ra), the maximum height (Rmax) and the ten-point mean height (Rz) are values each measured using a surface roughness/contour shape measurement apparatus (HANDY-SURF E-35A manufactured by TOKYO SEIMITSU CO., LTD.). The results are shown in Table 1B.

<Evaluation of Irregular shape of Decorative Sheet>

The irregularity impression was evaluated visually and tactilely for a change in irregular shape of the surface layer before and after formation of the irregularity protective layer in the process for producing the decorative sheet in each of examples and comparative examples. Separation of the irregularity protective layer from the decorative sheet was performed by manually separating the irregularity protective layer from the decorative sheet. The evaluation criteria are as follows. The results are shown in Table 1B.

○: There is little change in irregularity impression.

Δ: There is a slight change in irregularity impression.

x: There is a considerable change in irregularity impression, and an irregularity impression is not exhibited.

<Evaluation of Irregular shape of Decorative Resin Molded Article>

The irregularity impression was evaluated visually and tactilely for a change in irregular shape before and after production of the decorative resin molded article from each decorative sheet. The evaluation criteria are as follows. The results are shown in Table 1B.

○: There is little change in irregularity impression after production of the decorative resin molded article, and a high irregularity impression is exhibited.

Δ: There is a slight change in irregularity impression after production of the decorative resin molded article.

x: There is a considerable change in irregularity impression after production of the decorative resin molded article, and an irregularity impression is not exhibited.

TABLE 1B

|  | Example 1B | Example 2B | Example 3B | Comparative Example 1B | Comparative Example 2B |
|---|---|---|---|---|---|
| Surface layer | EB1 | Acrylic resin film | EB2 | EB1 | EB1 |
| Bonding of surface layer and irregularity protective layer | Adhesive containing polyester resin composition | Adhesive containing polyester resin composition | Adhesive containing polyester resin composition | Extrusion molding of polyethylene | Heat lamination of polyethylene film |
| Evaluation of irregular shape of decorative sheet | ○ | ○ | ○ | x | Δ |
| Evaluation of irregular shape of decorative resin molded article | ○ | ○ | ○ | x | Δ |
| Surface roughness of decorative resin molded article  Ra (μm) | 2.5 | 2.51 | 2.45 | 0.23 | 1.42 |
| Rmax (μm) | 15.42 | 12.47 | 17.3 | 0.91 | 7.63 |
| Rz (μm) | 13.24 | 10.98 | 12.93 | 0.82 | 6.59 |

In Table 1B, "-" means that measurement was not performed.

EB1
Difunctional polycarbonate acrylate (weight average molecular weight: 10,000): 95 parts by mass
Tetrafunctional urethane acrylate oligomer (weight average molecular weight: 6,000): 5 parts by mass EB2
Difunctional polycarbonate acrylate (weight average molecular weight: 8,000):
95 Parts by Mass
Difunctional silicone acrylate oligomer (weight average molecular weight: 6,000): 5 parts by mass EB3
Trifunctional pentaerythritol acrylate (weight average molecular weight: 300): 30 parts by mass
Acryl polymer (weight average molecular weight: 120,000): 70 parts by mass Polyester Resin Composition in Adhesive Layer
polyester polyol: isocyanate=100:10

Polyethylene Extrusion-Molded in Comparative Example 1B
Extrusion grade low-density PE Polyethylene Film Heat-Laminated in Comparative Example 2B
low-density PE film

DESCRIPTION OF REFERENCE SIGNS

1: Base material layer
2: Surface layer
3: Irregularity protective layer
4: Primer layer
5: Pattern layer
6: Transparent resin layer
7: Resin layer
8: Molded resin layer
30: Thermoplastic resin film layer
31: Adhesive layer
32: Release layer
33: Release film layer
34: Adhesive layer

The invention claimed is:

1. A decorative sheet in which at least a base material layer, a surface layer formed of a cured product of a curable resin composition and having an irregular shape, and a releasable thermoplastic resin film layer are laminated in this order, wherein
   a pattern layer is laminated between the base material layer and the surface layer,
   at least a portion of the recesses in the irregular shape formed by the surface layer reach the base material layer,
   the thermoplastic resin film layer fills recesses in the irregular shape of the surface layer,
   the thermoplastic resin film layer is a single layer, and
   the thermoplastic resin film layer is directly laminated on the surface layer to fill the recesses in the irregular shape.

2. The decorative sheet according to claim 1, wherein the surface layer is formed of a cured product of an ionizing radiation curable resin composition.

3. The decorative sheet according to claim 2, wherein the thermoplastic resin film layer is laminated on the irregular shape of the surface layer by extrusion molding or heat lamination.

4. The decorative sheet according to claim 1, wherein the thermoplastic resin film layer contains a noncrystalline polyester resin.

5. The decorative sheet according to claim 1, wherein the thermoplastic resin film layer is laminated on the irregular shape of the surface layer by extrusion molding or heat lamination.

6. The decorative sheet according to claim 1, wherein a primer layer is laminated immediately below the surface layer.

7. The decorative sheet according to claim 1, wherein the thickness of the surface layer is 0.01 to 30 μm.

8. A method for producing the decorative sheet according to claim 1, the method including:
   a first step of forming a laminated body in which a surface layer having an irregular shape and formed of a cured product of a curable resin composition is laminated on a base material layer; and
   a second step of laminating a releasable thermoplastic resin film layer on the surface layer of the laminated body obtained in the first step.

9. The method for producing a decorative sheet according to claim 8, wherein the thermoplastic resin film layer contains a noncrystalline polyester resin.

10. The method for producing a decorative sheet according to claim 8, wherein the second step includes the steps of:

laminating the releasable thermoplastic resin film layer on the surface layer by extrusion molding or heat lamination so as to fill recesses in the irregular shape of the surface layer.

11. A method for producing a decorative resin molded article with a thermoplastic resin film layer, the method including the step of laminating a molded resin layer on the base material layer of the decorative sheet according to claim 1 by injecting a resin.

12. The decorative sheet according to claim 1, wherein the surface of the thermoplastic resin film layer on a side opposite to the surface layer is flat.

13. The decorative sheet according to claim 1, wherein the thermoplastic resin film layer is formed by a thermoplastic resin consisting of a group selected from acrylonitrile-butadiene-styrene resins, acrylonitrile-styrene-acrylic acid ester resins, acrylic resins, polyolefin-based resins and polyester resins.

14. A decorative resin molded article with a thermoplastic resin film layer in which at least a molded resin layer, a base material layer, a surface layer formed of a cured product of a curable resin composition and having an irregular shape, and a releasable thermoplastic resin film layer are laminated in this order, wherein
- a pattern layer is laminated between the base material layer and the surface layer,
- at least a portion of the recesses in the irregular shape formed by the surface layer reach the base material layer,
- the thermoplastic resin film layer fills recesses in the irregular shape of the surface layer,
- the thermoplastic resin film layer is a single layer, and
- the thermoplastic resin film layer is directly laminated on the surface layer to fill the recesses in the irregular shape.

15. A method for producing a decorative resin molded article, the method including the step of separating the thermoplastic resin film layer from the decorative resin molded article with the thermoplastic resin film layer according to claim 14.

* * * * *